US006860346B2

(12) United States Patent
Burt et al.

(10) Patent No.: US 6,860,346 B2
(45) Date of Patent: Mar. 1, 2005

(54) ADJUSTABLE DIAMETER WHEEL ASSEMBLY, AND METHODS AND VEHICLES USING SAME

(75) Inventors: Ian T. Burt, Edina, MN (US); Nikolaos P. Papanikolopoulos, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 10/417,296

(22) Filed: Apr. 16, 2003

(65) Prior Publication Data

US 2004/0000439 A1 Jan. 1, 2004

Related U.S. Application Data

(60) Provisional application No. 60/373,925, filed on Apr. 19, 2002.

(51) Int. Cl.[7] .................. B62D 57/024; B60B 19/04
(52) U.S. Cl. .................. 180/8.2; 180/218; 301/45
(58) Field of Search .................. 180/6.2, 7.1, 21, 180/218, 8.2, 8.3, 5.2; 301/45, 46, 5.1; 305/1, 4, 60; 901/1; 446/448, 465

(56) References Cited

U.S. PATENT DOCUMENTS

| | | | | |
|---|---|---|---|---|
| 1,408,885 A | * | 3/1922 | Humphrey | 301/46 |
| 2,818,301 A | * | 12/1957 | Hayden | 301/46 |
| 4,300,308 A | | 11/1981 | Ikeda | |
| 4,334,221 A | | 6/1982 | Rosenhagen et al. | |
| 4,402,158 A | | 9/1983 | Seki et al. | |
| 4,406,085 A | | 9/1983 | Rhodes | |
| 4,443,968 A | | 4/1984 | Law | |
| 4,572,530 A | | 2/1986 | Marino | |
| 4,575,304 A | | 3/1986 | Nakagawa et al. | |
| 4,648,853 A | * | 3/1987 | Siegfried | 446/448 |
| 4,736,826 A | | 4/1988 | White et al. | |
| 4,773,889 A | * | 9/1988 | Rosenwinkel et al. | 446/448 |
| 4,899,945 A | | 2/1990 | Jones | |
| 4,906,051 A | * | 3/1990 | Vilhauer, Jr. | 301/38.1 |
| 4,913,458 A | | 4/1990 | Hamilton | |
| 4,993,912 A | | 2/1991 | King et al. | |

(List continued on next page.)

FOREIGN PATENT DOCUMENTS

| | | | |
|---|---|---|---|
| GB | 2194457 | * | 3/1988 |
| JP | 63-269701 | * | 11/1988 |
| JP | 10-69314 | | 3/1998 |

OTHER PUBLICATIONS

Balch et al., "Behavior–based Formation Control for Multi–robot Teams", *IEEE Transactions on Robotics and Automation*, 1998;14(6):1–15.

Burgard et al., "Collaborative Multi–Robot Exploration," *IEEE International Conference on Robotics and Automation (ICRA)*, 2000; 6 pgs.

Cao et al., "Cooperative Mobile Robotics: Antecedents and Directions", *Autonomous Robots*, 1997; 4(1):7–27.

(List continued on next page.)

*Primary Examiner*—Anne Marie Boehler
(74) *Attorney, Agent, or Firm*—Mueting, Raasch & Gebhardt, P.A.

(57) ABSTRACT

A powered wheel assembly, and method and ground-engaging vehicle (e.g., a robotic vehicle) using the same, are provided. The vehicle incorporates at least one of the wheel assemblies on its chassis body. In addition to its ability to propel the vehicle across a surface, the wheel assembly is reconfigurable between a retracted configuration, wherein the wheel assembly has a first rolling diameter, and an expanded configuration, wherein the wheel assembly has a second rolling diameter greater than the first rolling diameter. A drive motor assembly may both rotate the wheel assembly, e.g., propel the vehicle across a surface, and selectively actuate the wheel assembly from the first rolling diameter to the second rolling diameter, or to any intermediate rolling diameter.

22 Claims, 15 Drawing Sheets

U.S. PATENT DOCUMENTS

| | | | |
|---|---|---|---|
| 5,241,380 A | | 8/1993 | Benson et al. |
| 5,350,033 A | | 9/1994 | Kraft |
| 5,473,364 A | | 12/1995 | Burt |
| 5,487,692 A | * | 1/1996 | Mowrer et al. ............. 446/465 |
| 5,551,545 A | | 9/1996 | Gelfman |
| 5,554,914 A | | 9/1996 | Miyazawa |
| 5,576,605 A | | 11/1996 | Miyazawa |
| 5,596,255 A | | 1/1997 | Miyazawa |
| 5,610,488 A | | 3/1997 | Miyazawa |
| 5,721,691 A | | 2/1998 | Wuller et al. |
| 5,732,074 A | | 3/1998 | Spaur et al. |
| 5,759,083 A | | 6/1998 | Polumbaum et al. |
| 5,839,795 A | * | 11/1998 | Matsuda et al. ............. 301/5.1 |
| 5,888,135 A | | 3/1999 | Barton, Jr. et al. |
| 5,908,454 A | | 6/1999 | Zyburt et al. |
| 6,101,951 A | | 8/2000 | Sigel |
| 6,109,568 A | | 8/2000 | Gilbert et al. |
| 6,199,880 B1 | | 3/2001 | Favorito et al. |
| 6,322,088 B1 | | 11/2001 | Klamer et al. |
| 6,502,657 B2 | | 1/2003 | Kerrebrock et al. |
| 6,548,982 B1 | | 4/2003 | Papanikolopoulos et al. |

OTHER PUBLICATIONS

Carts–Powell, "Spring–loaded Spies", [online]; *New Scientist*, retrieved from the Internet on Jan. 4, 2000 at : <URL-www.newscientist.com/ns/19991113/newsstory1.html>; 3 pgs.

Defense Advanced Research Projects Agency (DARPA), "Distributed Robotics", [online]; retrieved from the Internet on Jan. 4, 2000 at: <URL:www.darpa.mil/MTO/DRobotics/index.html>, 2 pgs.

Defense Advanced Research Projects Agency (DARPA), "Distributed Robotics Using Reconfigurable Robots", [online]; retrieved from the Internet on Jan. 4, 2000 at: <URL:www.darpa.mil/MTO/DRobotics/98DROverviews/-university–10.html>, 2 pgs.

Dillmann et al., "PRIAMOS: An Advanced Mobile System for Service, Inspection, and Surveillance tasks", *Modelling and Planning for Sensor Based Intelligent Robot Systems*, vol. 21 of *Series in Machine Perception and Artifical Intelligence*, World Scientific, Singapore; 1995; 22 pgs.

Drenner et al., "Mobility Enhancements to the Scout Robot Platform," *Proceedings of the 2002 IEEE International Conference on Robotics and Automation*, Washington, DC, 2002, May 11–15; 1069–1074.

Drenner et al., "Communication and Mobility Enhancements to the Scout Robot," *Proceedings of the 2002 IEEE/RSJ International Conference on Intelligent Robots and Systems*, EPFL Lausanne, Switzerland, Sept. 30–Oct. 4, 2002; 1:865–870.

Elfes, "Using Occupancy Grids for Mobile Robot Perception and Navigation", *IEEE Computer*, 1989; 22(6):46–57.

Everett et al., "From Laboratory to Warehouse: Security Robots Meet the Real World", *Int'l Journal of Robotics Research*, 1999; 18(7):760–768.

Fox et al., "Collaborative Multi–Robot Localization", *Proc. of the German Conference on Artificial Intelligence (KI)*, Germany; date unknown; 12 pgs.

Fox et al., "A Probabilistic Approach to Collaborative Multi–Robot Localization", *Autonomous Robots*, 2000; 8(3):325–344.

Kajiwara et al., "Development of a Mobile Robot for Security Guard", *Proceedings of the 15th Int'l Symposium on Industrial Robots*, 1985; 1:271–278.

Kochan, "HelpMate to ease hospital delivery and collection tasks, and assist with security", *Industrial Robot*, 1997; 24(3):226–228.

Mataric, "Behaviour–based control: examples from navigation, learning, and group behavior", *J. Expt. Theor. Artif. Intell.*, 1997; 9(2–3):323–336.

Orwig, "Cybermotion's Roving Robots", *Industrial Robot*, 1993; 20(3):27–29.

Osipov et al., "Mobile robots for security", *Proceedings of the 1996 2nd Specialty Conference on Robotics for Challenging Environments*, RCE–II, 1996; 290–295.

Parker, "On the design of behavior–based multi–robot teams", *Advanced Robotics*, 1996; 10(6):547–578.

Pellerin, "Twenty–first Century Sentries", *Industrial Robot*, 1993; 20(2):15–17.

Porteous, "Intelligent Buildings and Their Effect on the Security Industry", *Proceedings of the Institute of Electrical and Electronics Engineers, 29th Annual 1995 International Carnahan Conference on Security Technology*, Sanderstead, Surrey, England, 1995; 186–188.

Pritchard et al., "Test and Evaluation of Panoramic Imaging Security Sensor for Force Protection and Facility Security", *Proceedings of the Institute of Electrical and Electronics Engineers, 32nd Annual 1998 International Carnahan Conference on Security Technology*, Alexandria, VA, 1998; 190–195.

Rybski et al., "Enlisting Rangers and Scouts for Reconnaissance and Surveillance", *IEEE Robotics & Automation Magazine*, 2000; 14–24.

Saitoh, "A Mobile Robot Testbed with Manipulator for Security Guard Application", *Proc. of the IEEE Int'l Conference on Robotics and Automation*, Nagoya, Japan, 1995; 3:2518–2523.

Weisbin et al., "Miniature Robots for Space and Military Missions", *IEEE Robotics and Automation Magazine*, Sep. 1999,; 6(3):9–18.

* cited by examiner

ADJUSTABLE DIAMETER WHEEL ASSEMBLY, AND METHODS AND VEHICLES USING SAME This application claims the benefit of U.S. Provisional Patent Application Ser. No. 60/373,925, filed 19 Apr. 2002, which is incorporated herein by reference in its entirety.

GOVERNMENT RIGHTS

The present invention was made with support from the Defense Advanced Research Projects Agency under Contract No. MDA972-98-C-0008. The U.S. government may have certain rights in this invention.

TECHNICAL FIELD

The present invention relates generally to the field of vehicle wheels. More particularly, the present invention relates to a wheel assembly and motorized vehicle, e.g., a robotic vehicle, incorporating the same, as well as to a method of using the wheel assembly, wherein the wheel assembly has a selectively adjustable range of rolling diameters.

BACKGROUND

Reconnaissance and surveillance are important activities for both military and civilian organizations alike. While by no means a complete list, hostage and survivor rescue missions, illicit drug raids, and response to chemical or toxic waste spills are some of the operations that may benefit from a reconnaissance or surveillance component.

While various systems may satisfactorily provide this capability, one promising solution is provided by the use of one or more robotic vehicles. These robotic vehicles, operating either autonomously, semi-autonomously, or under remote control, travel into areas deemed unsafe or otherwise unfriendly to humans and relay information back to remote personnel/equipment. While the exact configuration may vary, they typically include at least a chassis or body to carry the vehicle's payload and operational components (e.g., communication equipment, power supply, etc.), as well as powered ground-engaging members, e.g., wheels, to propel the vehicle over terrain. Using a variety of sensors associated with the body, these robotic vehicles may act as remote and mobile eyes, ears, noses, etc. of a reconnaissance/surveillance system.

Because some reconnaissance/surveillance activities require covert action and/or movement within small spaces, these robotic vehicles may be relatively small. In addition to minimizing their detection and allowing movement through small spaces, a miniaturized vehicle is also easy to transport and deliver to the target site. Moreover, small size allows for a greater number of vehicles to be brought into use for a single operation, and further makes individual robots expendable without jeopardizing the overall goal.

While small robotic vehicles are advantageous for their ability to perform these reconnaissance/surveillance tasks, drawbacks exist. For example, due to their small size and minimal ground clearance, these vehicles have somewhat limited ability, at least when moving under wheel power, to traverse rough or uneven terrain. Moreover, their elevation may be less than desirable for particular applications. While increasing wheel diameter provides increased ground clearance, simply adding larger wheels may adversely affect the robot's versatility, e.g., may make it more difficult to be carried and/or launched from certain delivery devices; and may reduce or otherwise limit its ability to travel into cramped areas or through small entryways.

SUMMARY

The present invention provides powered wheel assemblies, and methods and vehicles (e.g., robotic vehicles) using the same. In addition to its ability to propel the vehicle across a surface, the wheel assembly is reconfigurable between a retracted configuration, wherein the wheel assembly has a first rolling diameter, and an expanded configuration, wherein the wheel assembly has a second rolling diameter greater than the first rolling diameter. A drive motor assembly may both rotate the wheel assembly, e.g., propel the vehicle across a surface, and selectively actuate the wheel assembly from the first rolling diameter to the second rolling diameter, or to any intermediate rolling diameter.

In one embodiment, a wheel assembly adjustable to provide a range of rolling diameters is provided. The wheel assembly includes a main shaft having an externally threaded portion, as well as a first hub and a second hub located on or adjacent the main shaft. Either the first hub or the second hub is threadably coupled to the threaded portion of the main shaft. At least one reconfigurable wheel member is also provided and coupled to both the first hub and the second hub. The wheel member has ground contact portions that define the rolling diameter of the wheel assembly. A selectively engageable locking apparatus is also provided and operable to restrict rotation of the main shaft relative to the first hub and the second hub.

In another embodiment, a wheel assembly with a selectively variable rolling diameter is provided and includes a main shaft having an externally threaded portion. A first hub and a second hub are also provided and located on or adjacent the main shaft. At least one of the first hub and the second hub is threadably coupled to the threaded portion of the main shaft. A plurality of first links each pivotally coupled to the first hub is further included, as is a plurality of second links. Each of the plurality of second links is pivotally coupled to both the second hub and to one of the plurality of first links, wherein ground contact portions of two or more of the plurality of first links or two or more of the plurality of second links define the rolling diameter. Movement along the main shaft of the first hub relative to the second hub thus results in radial displacement of the ground contact portions relative to an axis of the wheel assembly.

In yet another embodiment, a powered wheel assembly operable to provide a selectable range of rolling diameters to a vehicle is provided. The wheel assembly includes a main shaft having an externally threaded portion. A first hub positioned for rotation about an axis of the main shaft and a second hub threadably engaged with the externally threaded portion of the main shaft are also included. A plurality of first links are each pivotally coupled to the first hub, and a plurality of second links are each pivotally coupled to both the second hub and to one of the plurality of first links. Ground contact portions of either the plurality of first links or the plurality of second links define a rolling diameter of the wheel assembly.

In still yet another embodiment a method of varying a rolling diameter of a powered wheel assembly for use with a ground-engaging vehicle is provided. The method includes providing a wheel assembly attached to the vehicle, wherein the wheel assembly includes: a main shaft having an externally threaded portion; a first hub positioned for rotation about an axis of the main shaft; a second hub threadably engaged with the externally threaded portion of the main shaft; a plurality of first links each pivotally coupled to the first hub; and a plurality of second links each pivotally coupled to both the second hub and to one of the plurality of first links, wherein ground contact portions of either the plurality of first links or the plurality of second links define a rolling diameter of the wheel assembly. The method further includes selectively preventing relative rotation between the main shaft and the vehicle. Rotating the first hub in a first direction thereby causes the second hub to move along the threaded portion of the main shaft toward the first hub, thus repositioning the plurality of first links and the plurality of second links such that the ground contact portions move radially outward from the-axis of the main shaft.

In yet another embodiment, a robotic vehicle having an adjustable ground clearance is provided. The vehicle includes a driving apparatus coupled to a body of the vehicle and operable to provide driving power to the vehicle, and at least one wheel assembly coupled to the body of the vehicle. The at least one wheel assembly includes: a main shaft having an externally threaded portion; a first hub positioned for rotation about an axis of the main shaft; a second hub threadably engaged with the externally threaded portion of the main shaft; and at least one reconfigurable wheel member coupled to both the first hub the second hub, the wheel member having ground contact portions that define a rolling diameter of the at least one wheel assembly. A locking apparatus coupled to the body of the vehicle and operable to lock the main shaft relative to the body of the vehicle is further provided.

The above summary of the invention is not intended to describe each embodiment or every implementation of the present invention. Rather, a more complete understanding of the invention will become apparent and appreciated by reference to the following detailed description and claims in view of the accompanying drawing.

BRIEF DESCRIPTION OF THE VIEWS OF THE DRAWING

The present invention will be further described with reference to the views of the drawing, wherein.

DETAILED DESCRIPTION OF EXEMPLARY EMBODIMENTS

Figure 1:
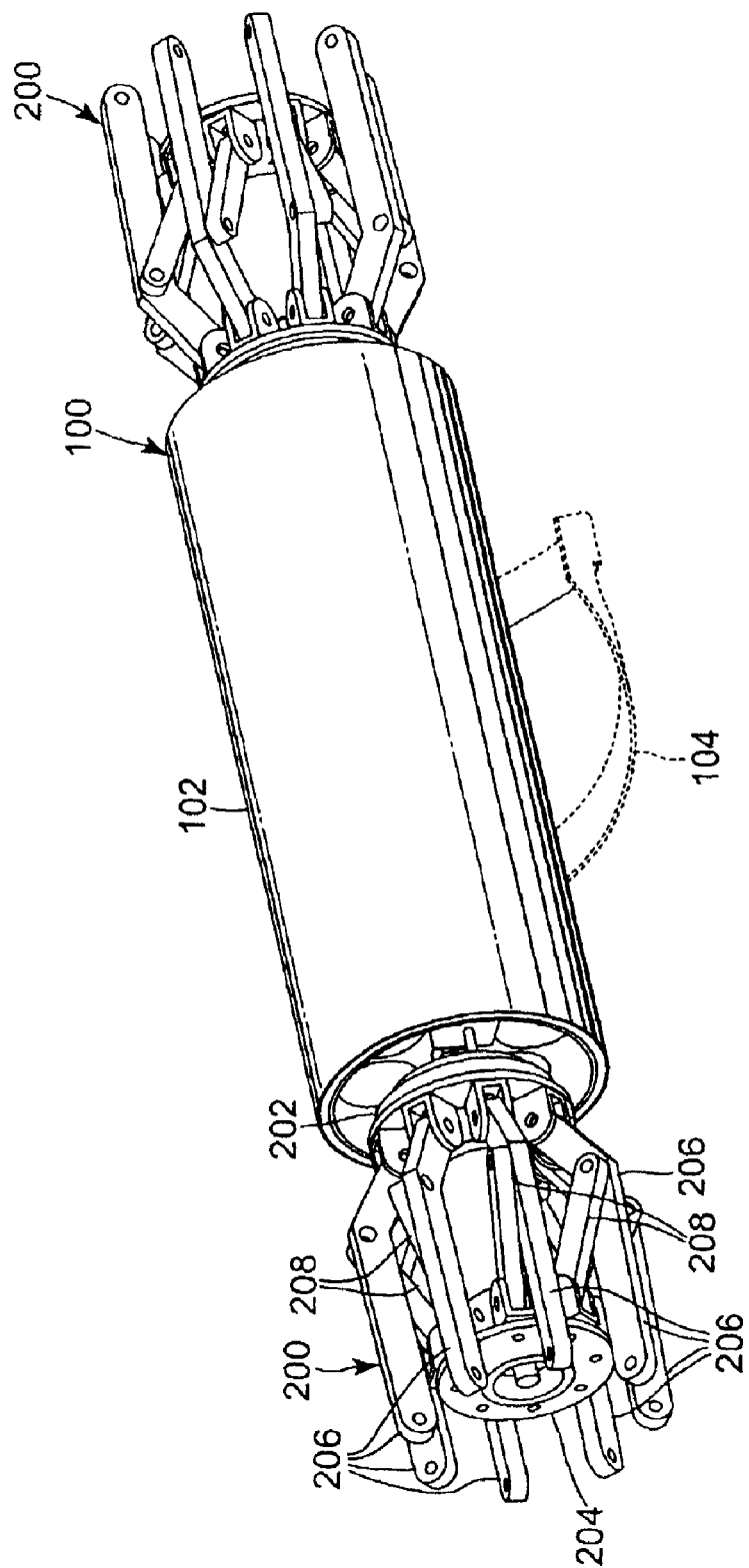
FIG. 1 is a diagrammatic perspective view of an exemplary robotic vehicle having an adjustable diameter wheel assembly in accordance with one embodiment of the present invention, the wheel assembly shown in a retracted configuration.

In the following detailed description of the embodiments, reference is made to the accompanying views of the drawing that form a part hereof, and in which are shown by way of illustration specific embodiments in which the invention may be practiced. It is to be understood that other embodiments may be utilized and structural changes may be made without departing from the scope of the present invention.

Various components that are either unnecessary to an understanding of the invention, or are otherwise easily understood by those of skill in the art (e.g., threaded fasteners), may be illustrated only diagrammatically in, or excluded altogether from, the drawing.

Generally speaking, the present invention is directed to a powered wheel assembly and a vehicle, e.g., robotic vehicle, incorporating the same, as well as to a method for using the wheel assembly. The wheel assembly includes at least one reconfigurable wheel member that is able to provide an operator-selectable range of rolling diameters. The wheel assembly may be both rotated (for propelling the vehicle) and actuated (for changing the rolling diameter) with a single drive motor assembly.

FIG. 1 illustrates an exemplary powered robotic vehicle 100 (also referred to herein merely as "vehicle" or "robot") utilizing an adjustable diameter wheel assembly in accordance with one embodiment of the invention. While the exact configuration of the robot 100 is not necessary to an understanding of the present invention, a brief description is provided below. For more information regarding exemplary robotic vehicles, see U.S. patent application Ser. No. 09/715,959, filed 17 Nov. 2000 and entitled *Miniature Robotic Vehicles and Methods of Controlling Same*; and *Enlisting Rangers and Scouts for Reconnaissance and Surveillance*, Rybski et al., *IEEE Robotics and Automation Magazine*, pp. 14–24, 2000, both of which are incorporated herein by reference in their respective entireties.

In the embodiment illustrated in FIG. 1, the vehicle 100 is a miniature robot of a size that permits it to maneuver into relatively tight or cramped spaces as well as remain generally undetected during some operations. While the actual size and shape of the vehicle 100 may vary depending on the particular application for which it is adapted, it has, in one embodiment, a generally cylindrical chassis or body 102 of about 2.5 centimeters (cm) to about 20 cm in diameter and about 10 cm to about 40 cm long. However, this is not to be considered limiting as the invention described herein is scalable and thus may find application with vehicles of most any diameter and length or, alternatively, vehicles of different form factors and shapes. Moreover, while not specifically described herein, the present invention may have applications beyond the field of robotics.

To provide mobility to the vehicle 100 over a variety of terrain, the vehicle may include one or more wheel assemblies 200 each having one or more reconfigurable wheel members as further described below. In the embodiments illustrated in the figures, the robotic vehicle 100 is shown having a generally identical wheel assembly 200 located at each end of the body 102. While illustrated with two wheel assemblies 200, other embodiments may include any number of wheel assemblies depending on the particular vehicle geometry.

The vehicle 100 may also include a foot 104 which, in some embodiments, provides a resilient member that allows the vehicle 100 to jump over (or onto) obstacles, e.g., over a gate or onto an obstacle such as a step, encountered during operation. In these embodiments, the foot 104 can be moved, e.g., deflected, between at least a first, stored position and a second, extended position (described in more detail in U.S. patent application Ser. No. 09/715,959 and Rybski et al. identified above).

The foot 104 also functions as a dragging member to resist body torque during movement of the vehicle 100. That is, when the wheel assemblies 200 are used to propel the vehicle 100, the foot 104 prevents the body 102 from spinning about an axis of the wheel assemblies. In embodiments where the vehicle 100 does not require jumping, the foot 104 may be a more simplified resilient or rigid member.

To permit the collection of data, the vehicle 100 may include one or more on-board sensing devices. Data collected from these sensing devices may be transmitted to the remote computer utilizing on-board communication circuits. Other circuits may allow the vehicle to operate autonomously, semi-autonomously, remotely controlled, or by any combination thereof.

With this general introduction, adjustable diameter wheel assemblies in accordance with various embodiments of the present invention will now be described. As used herein, the term "rolling diameter" refers to the effective diameter of an imaginary circle defined by portions of the wheel assembly that contact a ground surface during propulsion, e.g., the effective diameter formed by ground contact portions of the wheel assembly that are most radially distant from the axis of rotation.

Each wheel assembly 200 may include a first hub 202 and a second hub 204. As further explained below, the first hub 22 of the embodiment of FIGS. 1–8 may be actively powered by the vehicle 100 while the second hub 204 may be driven through its interconnection to the first hub 202, as described below.

Each wheel assembly 200 may also include reconfigurable wheel members formed by a series of links. Two or more first links 206 may each be pivotally attached, e.g., at a respective first end, to the first hub 202 (e.g., along the periphery of the first hub). A corresponding number of second links 208 may each be pivotally attached, e.g., at a respective first end, to the second hub 204 (e.g., along the periphery of the second hub). Each second link 208 may also be pivotally coupled, e.g., at a respective second end, to a corresponding first link 206 such that the first hub 202 and the second hub 204 are coupled to one another by the first links 206 and second links 208. As a result, rotation of the first hub 202 causes rotation of the second hub 204. In one embodiment, each wheel assembly includes eight first links 206 and eight second links 208.

For clarity, the fastening elements used to form the pivot connections between the hubs 202, 204 and the links 206, 208 are not illustrated in the figures. As those of skill in the art will understand though, most any fastening element, e.g., bolt and nut, rivet, press fit or staked bushings, or combinations thereof, may be used to make the respective pivoting connections.

Figure 2:
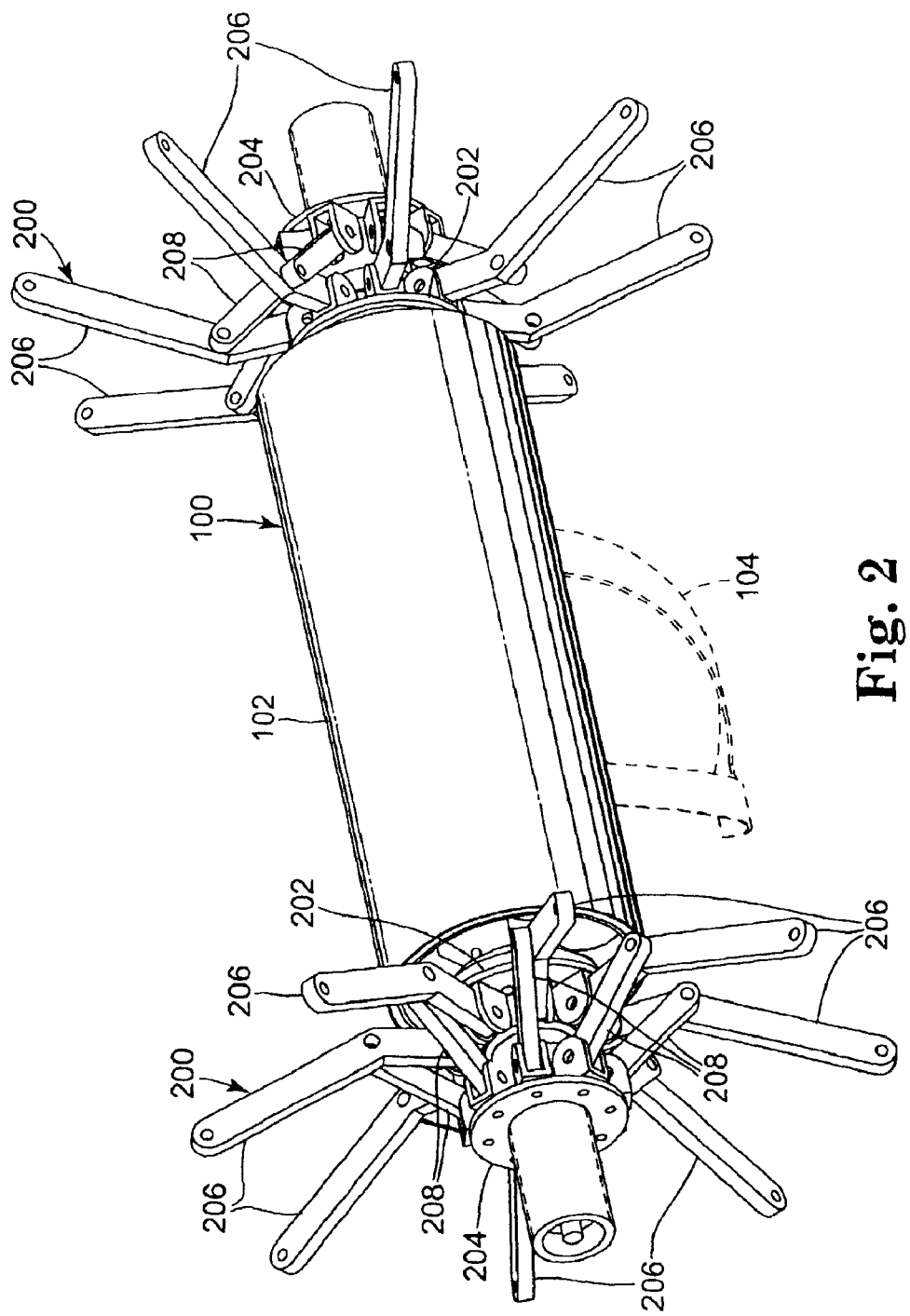
FIG. 2 is an opposite perspective view of the robotic vehicle of FIG. 1 with the wheel assembly shown in an expanded configuration.
Figure 3:
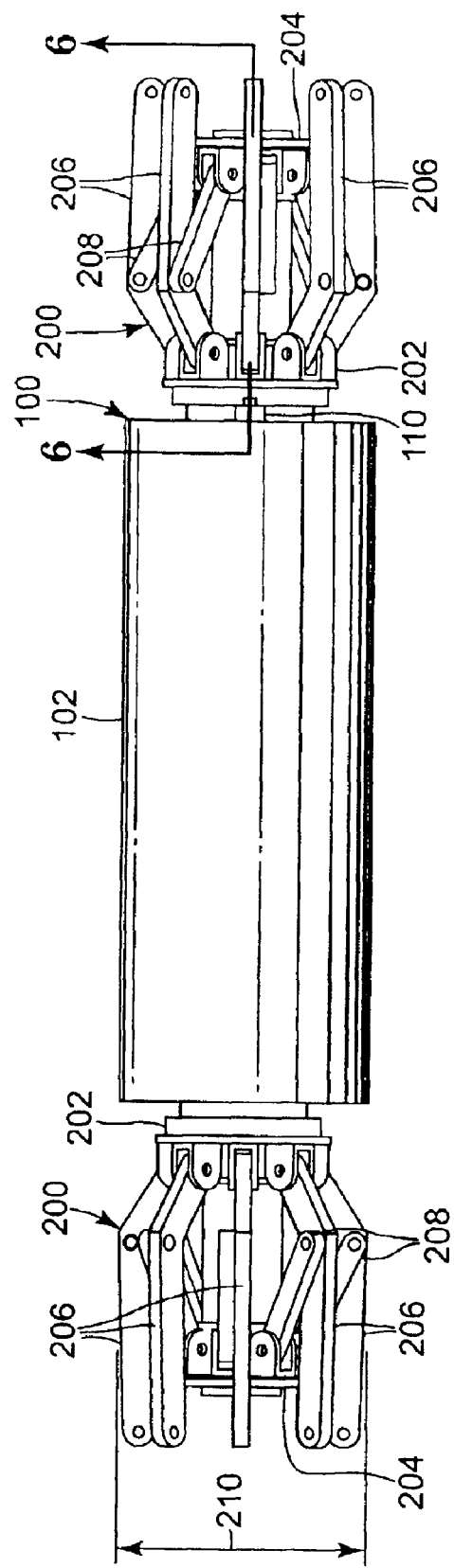
FIG. 3 is a front elevation view of the robotic vehicle of FIG. 1 with portions removed for clarity.
Figure 4:
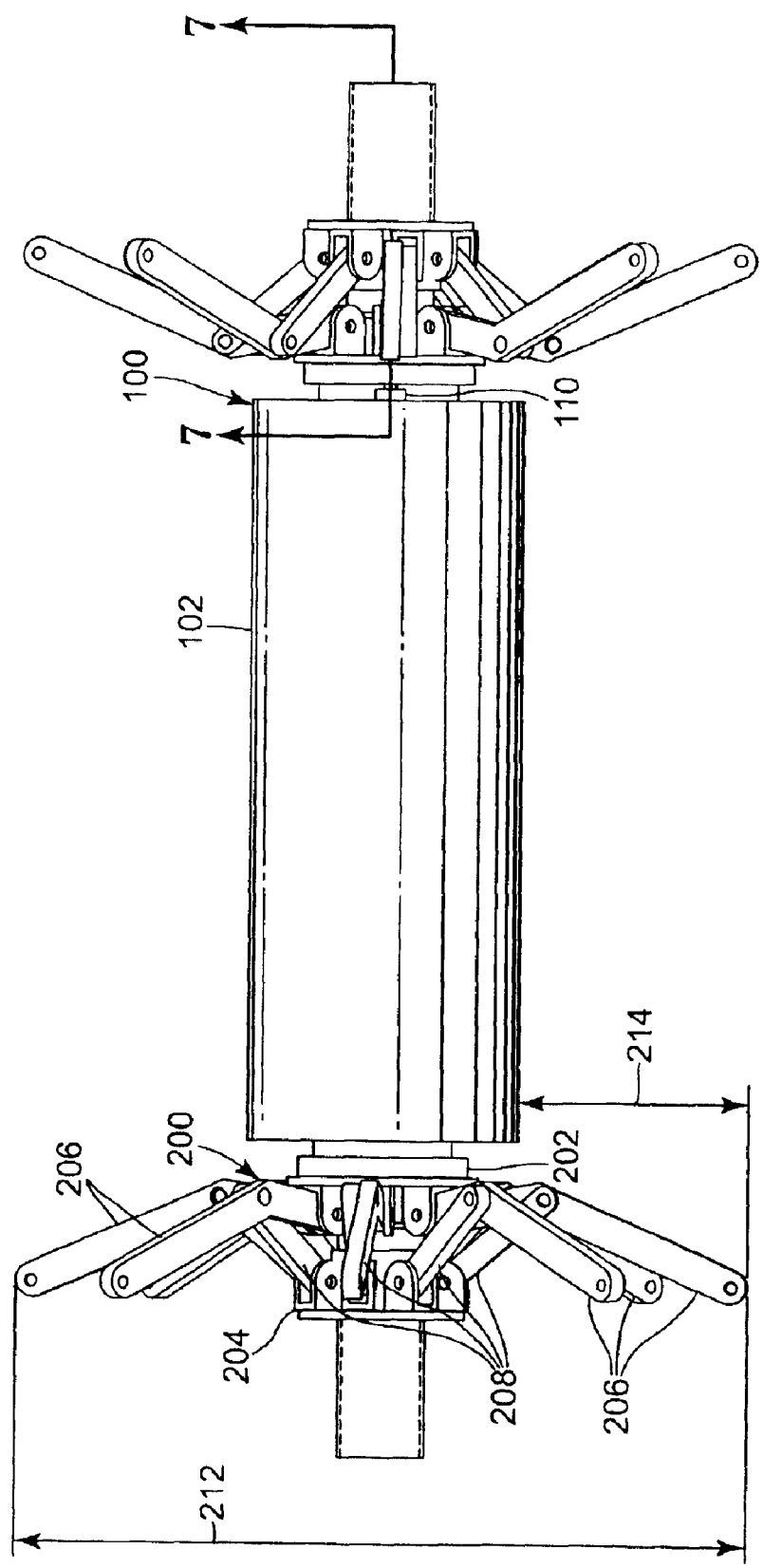
FIG. 4 is a front elevation view of the robotic vehicle of FIG. 2 with portions removed for clarity.

The wheel assemblies 200 are, in FIGS. 1 and 3, shown in a first retracted (e.g., fully retracted) configuration. That is, the wheel assemblies 200 are shown having a first minimal rolling diameter 210 (see FIG. 3). FIGS. 2 and 4 illustrate the robotic vehicle 100 with each wheel assembly 200 positioned in a second expanded (e.g., fully expanded) configuration. That is, the wheel assemblies 200 are shown having a second rolling diameter 212 (see FIG. 4) larger than the first rolling diameter 210. As further described below, each wheel assembly 200 is reconfigurable by relative axial movement of the second hub 204 relative to the first hub 202 and the resulting displacement of the first links 206 and the second links 208. FIG. 2 further illustrates the positioning of the foot member 104 to maintain ground contact when each wheel assembly 200 is in the expanded configuration.

FIG. 3 is a front elevation view of the vehicle 100 of FIG. 1 (note: the foot 104 is not illustrated in this view). This figure shows the wheel assemblies 200 in the first retracted configuration (e.g., having a first rolling diameter 210) to provide minimal ground clearance and minimal vehicle elevation. In the illustrated embodiment, the wheel assemblies 200 may be configured to retract such that the rolling diameter 210 is less than the diameter of the body 102 of the vehicle 100. This may be beneficial for some purposes such as to ensure that the wheel assembly 200 does not interfere with related equipment, e.g., storage canisters or delivery equipment. FIG. 3 also illustrates the relative axial positions of the first and second hubs 202, 204 and the first and second links 206, 208 when the wheel assembly 200 is in the retracted configuration.

FIG. 4 is a front elevation view of the vehicle 100 of FIG. 2 (note: the foot 104 is also not shown in this view). This figure shows the wheel assemblies 200 in the second, expanded configuration (e.g., having a second rolling diameter 212 larger than the first rolling diameter 210 of FIG. 3) to provide the vehicle 100 with maximum ground clearance 214 and vehicle 100 elevation. FIG. 4 also clearly illustrates the relative positions of the first and second hubs 202, 204 and the first and second links 206, 208 when the wheel assembly 200 is in the expanded configuration.

By selectively commanding the wheel assembly 200 to the expanded configuration shown in FIGS. 2 and 4, the vehicle 100 may traverse terrain that may otherwise pose a challenging obstacle. Moreover, the increased elevation provided by the expanded wheel configuration may allow better data gathering. When increased vehicle elevation is no longer required, the wheel assemblies 200 may be commanded to return from the second rolling diameter 212 (FIG. 4) to the first rolling diameter 210 (FIG. 3) or to any diameter therebetween. The smaller rolling diameter may provide various benefits, e.g., lower vehicle profile, better jumping configuration (when using the foot 104), etc.

While many applications benefit from maintaining both wheel assemblies 200 at substantially the same rolling diameter, each wheel assembly 200 may be individually actuated to provide a vehicle having wheel assemblies of differing rolling diameters.

Figure 5:
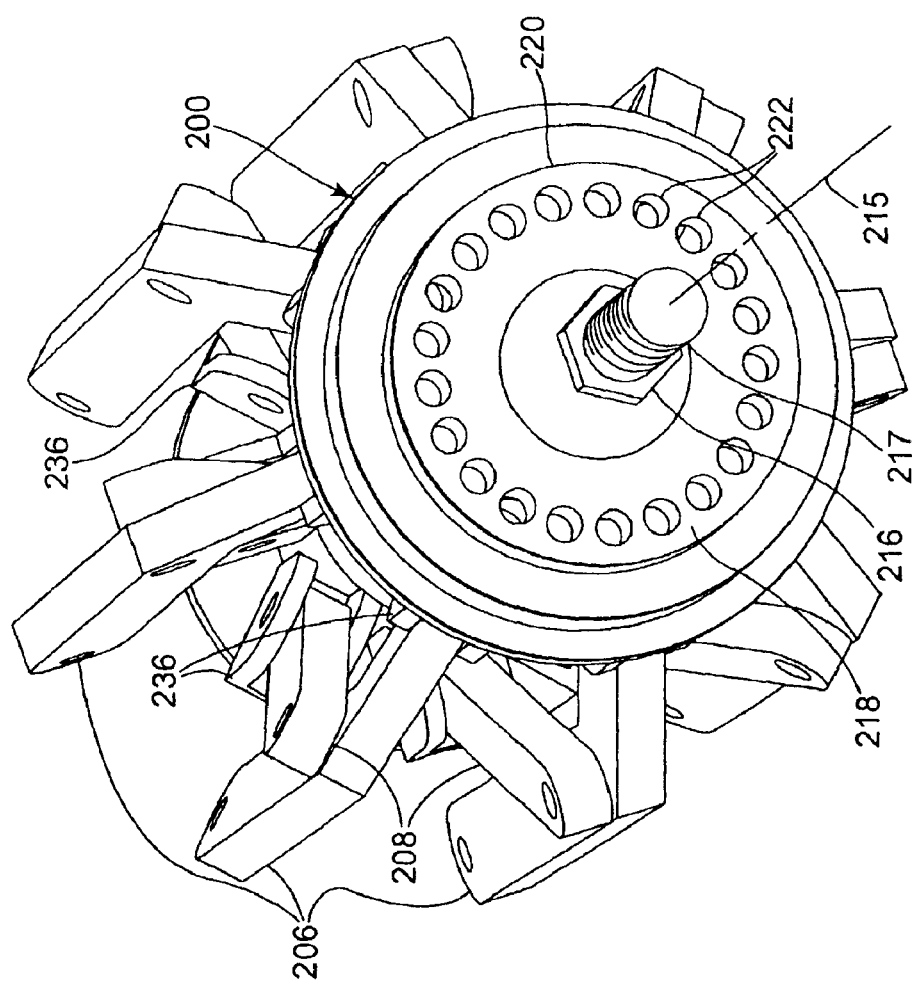
FIG. 5 is a partial enlarged, perspective view of the wheel assembly of FIG. 1.

FIG. 5 illustrates the wheel assembly 200 detached from the vehicle 100. In this view, the wheel assembly 200 is shown in the retracted position, with the first and second links 206, 208 oriented for minimal rolling diameter (e.g., rolling diameter 210 of FIG. 3). The wheel assembly 200 may include an axle 216 having a threaded portion 217 operable for receipt in the body 102 of the vehicle 100. The axle defines an axis of rotation 215 of the wheel assembly 200. Also visible in this view is an inner face 218 of a main shaft 220. The purpose of the main shaft 220, as well as that of openings 222 located on the inner face 218 thereof, is explained below with reference to FIGS. 6 and 7.

Figure 6:
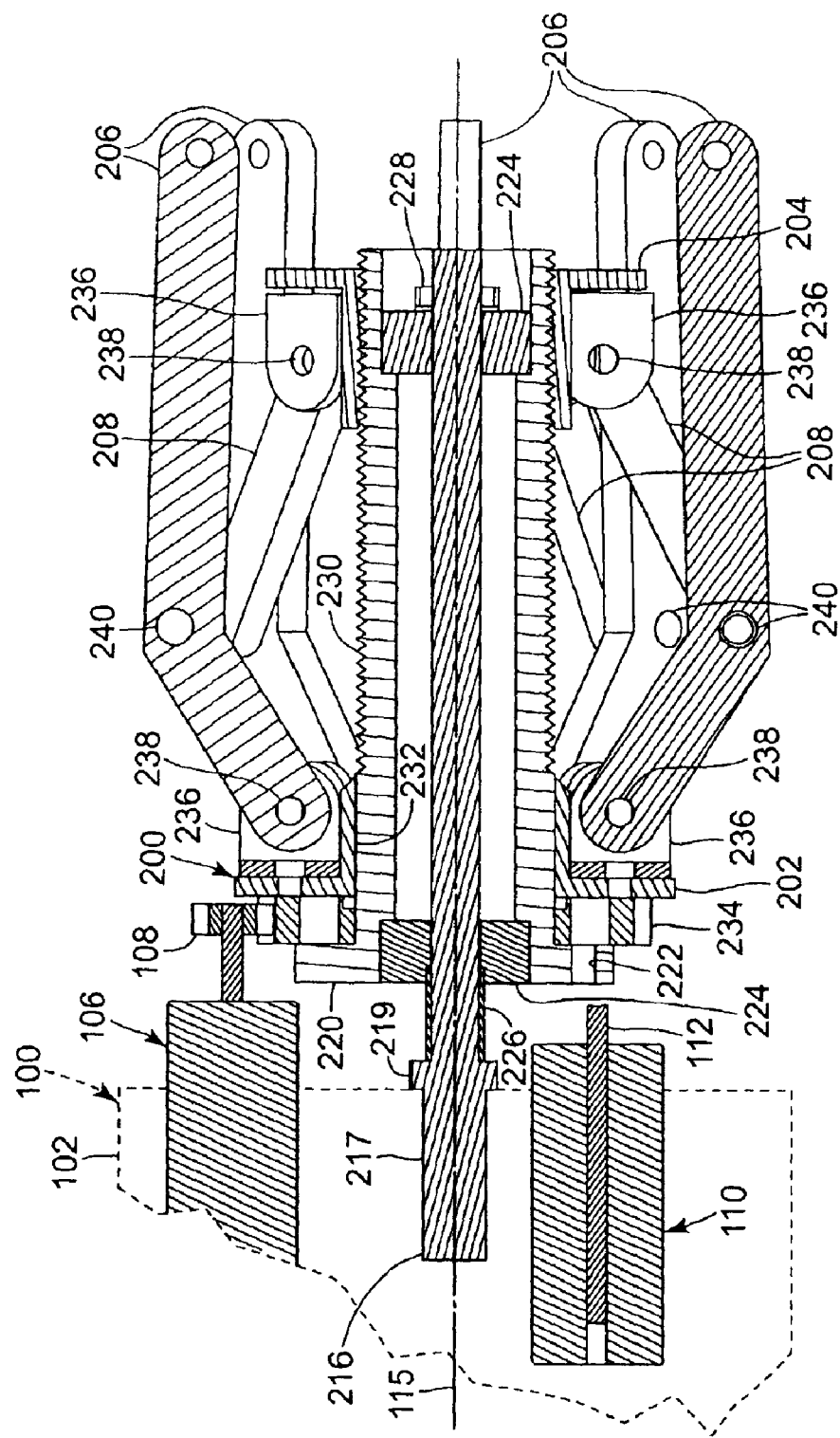
FIG. 6 is a partial section view of the robotic vehicle of FIG. 3 taken along line 6—6 (with the wheel in the retracted configuration)

FIG. 6 is a cross sectional view of the wheel assembly 200 and vehicle 100 described above with the wheel assembly shown in the retracted configuration. The threaded portion 217 of the axle 216 may be threaded into a receiving threaded hole in the body 102 of the vehicle 100. The axle 216 may include features, e.g., wrench flats 219 or the like, to more easily permit torquing of the axle 216 to the body 102. When installed, the axle 216 may be generally rigidly coupled to the body 102.

The main shaft 220 may be hollow and include counterbores at one or both ends to receive bearings 224. The distance between the body 102 and the main shaft 220 may be controlled by selecting a length of a spacer 226 placed therebetween, e.g., between the wrench flats 219 and the adjacent bearing 224. A nut 228 may threadably engage a distal end of the axle 216 to secure the main shaft 220 and bearings 224 relative to the axle 216. Once installed, the main shaft 220 may rotate about the axle 216 but is axially restrained by the nut 228 and bushing 226.

An external surface of the main shaft 220 preferably includes a threaded portion 230 and an unthreaded portion 232. The second hub 204 threadably engages the threaded portion 230 of the main shaft such that relative rotation between the main shaft and the second hub causes axial movement of the latter along the main shaft. The first hub 202, on the other hand, may be positioned over the unthreaded portion 232 of the main shaft 220 such that relative rotation between the main shaft and the first hub does not result in axial movement between the two components.

The first hub 202 may, if necessary, be restricted from axial outward motion relative to the main shaft 220 with the use of a retaining member, e.g., a collar (not shown) or the like. However, the weight of the vehicle 100 exerted on the links 206, 208 tends to force the hubs 202, 204 away from each other. Thus, an axial retaining member associated with the first hub 202 may be optional.

The first hub 202 may be rigidly secured to, or integrally formed with, a geared sprocket 234. In one embodiment, the first hub 202 and the sprocket 234 are separate components that are fastened, e.g., bolted, together during assembly.

The first links 206 and second links 208, as explained above, are pivotally secured to the first hub 202 and second hub 204, respectively at pivot joints 238. While most any technique may be used to form the pivot joints 238, the illustrated embodiment utilizes a dual clevis 236 (best viewed in FIG. 5). Each link 206, 208 may be positioned in one of the dual devises and secured thereto with any fastening element known in the art that will permit the desired pivoting motion, e.g., bolt, rivet, bushing, etc.

To deliver power to the wheel assembly 200, a driving apparatus, e.g., a drive motor assembly 106, associated with the body 102 of the vehicle 100 may be included. The drive motor assembly 106 may power an included pinion gear 108 which meshes with the sprocket 234, and thereby provide power to the wheel assembly 200. For reasons that will become apparent, the vehicle 100 may also include a locking apparatus, e.g., locking solenoid 110, having a movable lock member, e.g., solenoid pin 112, operable to engage one of the openings 222 in the main shaft 220.

To propel the vehicle 100 across a surface, the solenoid pin 112 of the locking solenoid 110 may be retracted as shown in FIG. 6. The wheel assembly 200 may then be rotated relative to the body 102 of the vehicle 100 by commanding the drive motor assembly 106 to rotate the pinion gear 108 in a first direction at a first speed. The opposite drive wheel assembly 200 may be commanded to rotate at an identical speed and direction, resulting in straight, forward motion. To change direction, e.g., turn, the opposite drive wheel assembly 200 may be stopped or rotated at a different speed and/or direction.

When the drive motor assembly 106 is commanded to rotate the pinion gear 108, the meshing gear action between the pinion gear 108 and the sprocket 234 results in rotation of the sprocket 234 and the attached first hub 202 about the axis 215. As the first hub 202 rotates, it imparts a rotational force to the first links 206, the second links 208, and second hub 204. Due to the relatively high friction between the threads of the second hub 204 and the main shaft 220, as compared to the friction between the axle 216 and the bearings 224, the main shaft 220 also rotates. That is, during normal rolling operation of the vehicle 100, the sprocket 234, the first hub 202, the second hub 204, the first links 206, the second links 208, and the main shaft 220 all rotate about the axle 216.

When it is beneficial to elevate the vehicle 100 relative to the ground surface (e.g., when increased vehicle or sensor height is desired, or when uneven terrain such as discontinuous or undulating surfaces like rocks, ground depressions, bumps, etc., is encountered), the wheel assembly 200 may be commanded to expand its rolling diameter (e.g., such as from the rolling diameter 210 of FIG. 3 to the rolling diameter 212 of FIG. 4) as further described below.

Figure 7:
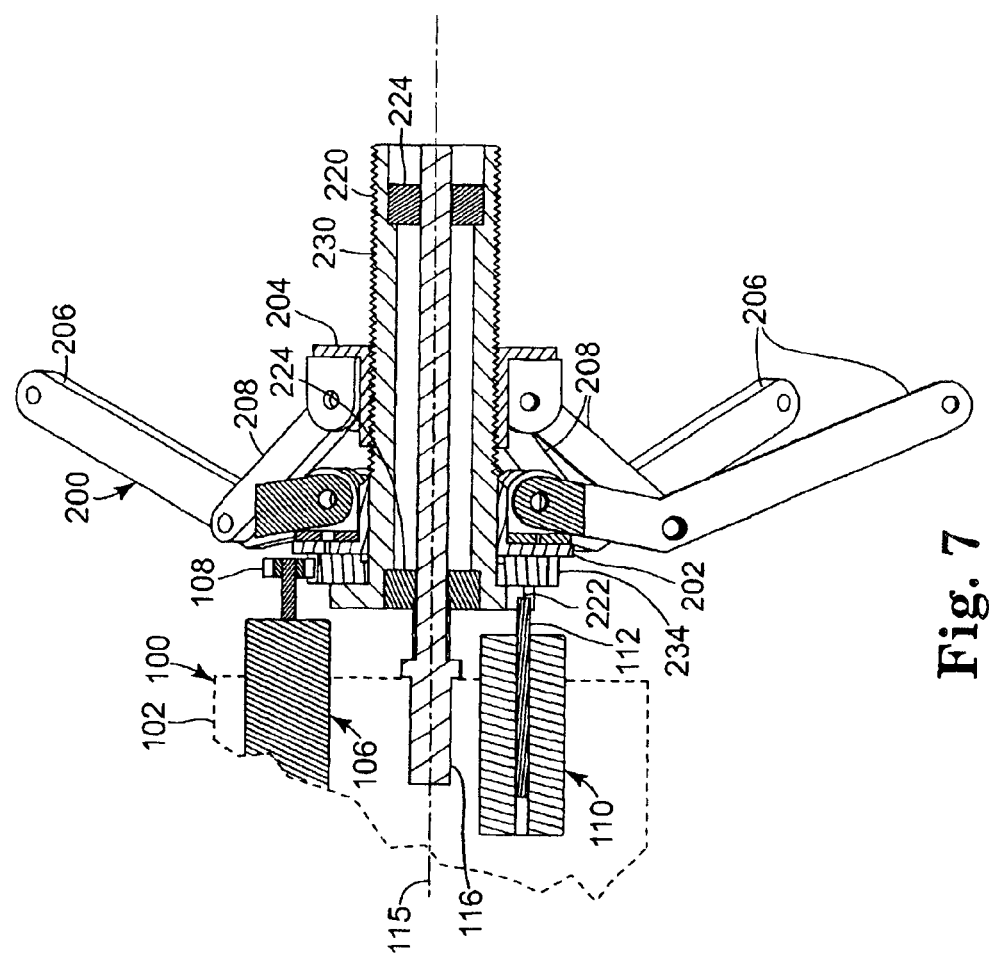
FIG. 7 is a partial section view of the robotic vehicle of FIG. 4 taken along line 7—7 (with the wheel in the expanded configuration)

FIG. 7 illustrates the wheel assembly 200 after it has been reconfigured to provide a larger rolling diameter, e.g., to the fully expanded configuration. To adjust the rolling diameter from the fully retracted configuration of FIG. 6 to the fully expanded configuration of FIG. 7, or to any rolling diameter in between, the vehicle 100 may be stopped and the locking solenoid 110 may be commanded to extend the solenoid pin 112 as shown in FIG. 7. The solenoid pin 112 may then engage one of the openings 222 in the inner face 218 (see FIG. 5) of the main shaft 220.

While disclosed herein as a locking solenoid 110 and pin 112, the locking apparatus could, in alternative embodiments, be similar to a friction braking device, e.g., a disk brake. In such a configuration, it may not be necessary to stop the wheel assembly 200 prior to terminating rotation of the main shaft 220. Moreover, instead of completely stopping rotation of the main shaft, a friction brake locking apparatus could merely limit or slow the rotational speed of the brake shaft 220. Furthermore, the locking apparatus could, in other embodiments, be coupled to the wheel assembly 200.

Once the solenoid pin 112 is engaged with the main shaft 220, the main shaft becomes generally rotationally fixed relative to the vehicle body 102. Rotation of the sprocket 234 in a first direction (resulting from rotation of the pinion gear 108) once again causes rotation of the first hub 202, the first links 206, the second links 208, and the second hub 206. However, with the main shaft 220 now generally fixed relative to the body 102, the main shaft remains stationary. As a result, rotation of the first and second hubs 202, 204 causes the second hub 204 to move axially along the threaded portion 230 of the main shaft 220 relative to, e.g., toward, the first hub 202. That is, the second hub 204 moves along the generally fixed main shaft 220 due to the mating engagement of the threaded portion 230 with the thread of the second hub 204.

As the second hub 204 approaches the first hub 202, the geometric relationship between the first and second links 206, 208 and the first and second hubs 202, 204 results in portions, e.g., distal ends, of the first links 206 moving radially away from the axis 115, thus raising the vehicle body 102 above the ground in the process.

While the wheel assembly 200 is shown in FIG. 7 in its fully expanded configuration, the pinion gear 108 maybe stopped at any time. Accordingly, the wheel assembly 200 can be moved from its fully retracted configuration, see e.g., FIG. 6, to its fully expanded configuration, see e.g., FIG. 7, or to any configuration inbetween. As the wheel assembly 200 may still rotate during actuation, the vehicle 100 may experience some forward (or rearward) motion during the expansion and contraction of the wheel assembly 200.

Figure 8:
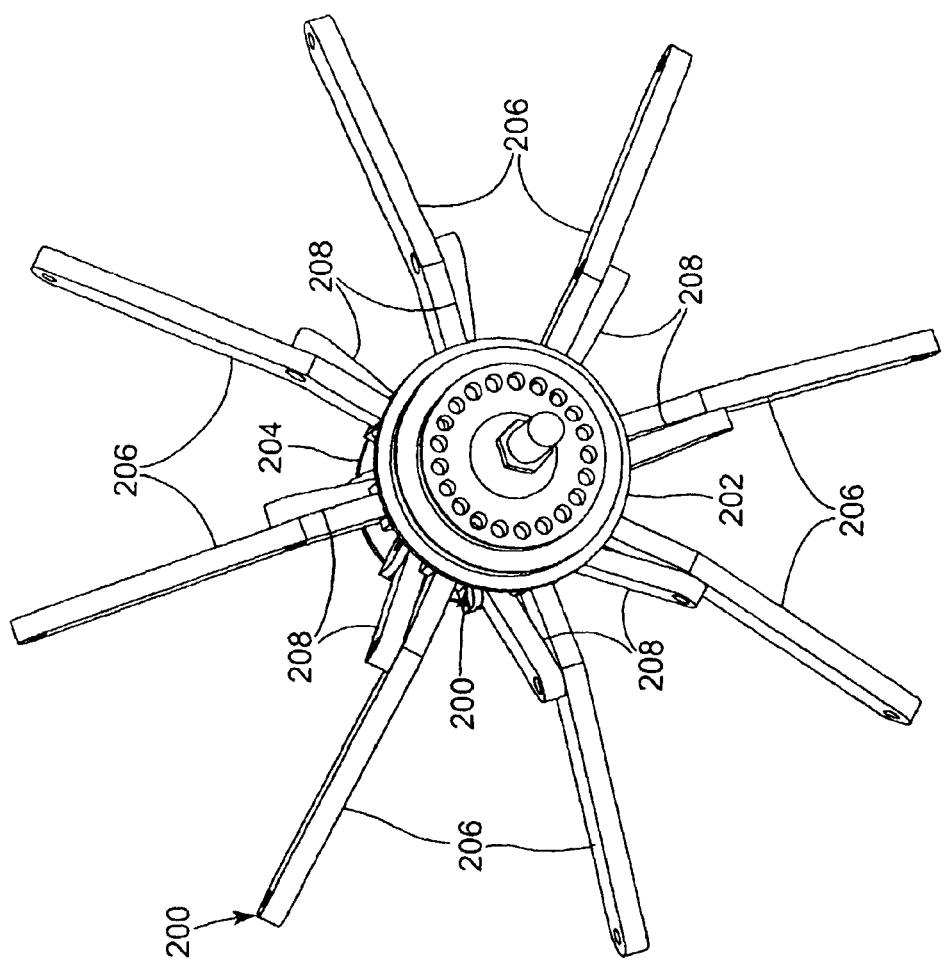
FIG. 8 is a partial enlarged, perspective view of the wheel assembly of FIG. 5, only shown in the expanded configuration.

When the wheel assembly 200 has reached the desired configuration, the drive motor assembly 106 may be commanded to stop to the pinion gear 108. The solenoid assembly 110 may then be commanded to retract the solenoid pin 112 from the opening 222 in the face 218 of the main shaft 220. Subsequent activation of the drive motor assembly 106 results in rotation of not only the hubs 202, 204 and links, 206, 208 about the axis 215, but also the main shaft 220. Accordingly, the wheel assembly 200 maintains its new rolling diameter and may again be used to propel the vehicle 100. FIG. 8 is a perspective view of the wheel assembly 200 shown in the expanded configuration.

The vehicle 100 may operate with the wheel assembly 200 in an expanded configuration, e.g., in the fully expanded configuration of FIGS. 7 and 8, indefinitely. When desirable or prudent, e.g., when the vehicle 100 approaches a small entrance or otherwise would benefit from a lower elevation, the procedure described above may be re-executed and the wheel assembly 200 returned to a configuration having a smaller rolling diameter. The wheel assembly 200 may be reconfigured to a retracted configuration (smaller rolling diameter) by again engaging the locking solenoid 110 and then driving the pinion gear 108 in a second direction opposite the first direction used to expand the wheel assembly 200.

In an exemplary embodiment, the vehicle 100 has a body 102 that is about 4 centimeters (cm) in diameter, about 10.2 cm long, and, with two wheel assemblies 200 attached, weighs about 500 grams (g) (the unit "gram," unless otherwise noted, refers to gram-force). The wheel assemblies 200 extend about 6 cm from the edge of the body 102 in the fully retracted configuration, and are actuatable over a range of rolling diameters (see 210, 212 in FIGS. 3 and 4) varying from about 3.9 cm to about 11 cm. The axial distance between the pivots 238 on the first hub 202 and the pivots 238 on the second hub 204, when the wheel assembly 200 is in the fully retracted configuration (see e.g., FIG. 6), is about 2.8 cm. The threaded portion 230 of the main shaft is a ½-20 UNF thread. The drive motor assembly 106 is rated for about 1.44 g-cm of torque on a continuous basis (after accounting for frictional and other losses), and produces about 3.6 g-cm of torque at stall. The drive motor assembly transmits torque through a planetary gearbox (not shown) to the pinion gear 108. The planetary gearbox (not shown) reduces the rotational speed by a factor of 64, bringing the continuous torque to about 92 g-cm. The pinion gear 108 has a pitch radius of about 0.15 cm, and the radius of the mating sprocket 234 is about 1.18 cm. The continuous duty torque available to the wheel assembly 200 is about 714 g-cm, although actual stall torque may be much higher.

FIGS. 9–13 illustrate a wheel assembly 300 in accordance with another embodiment of the invention. In this embodiment, a robotic vehicle 100' having a body 102' and a foot 104' is provided. The vehicle 100' is generally similar to the vehicle 100 described above, with some exceptions. For example, the wheel assemblies 300 retract over the body 102'. As a result, the overall length of the vehicle 100' may be reduced. Moreover, as further described below, the wheel assembly 300 is driven by a central powered axle rather than by the offset pinion gear described above.

Figure 9:
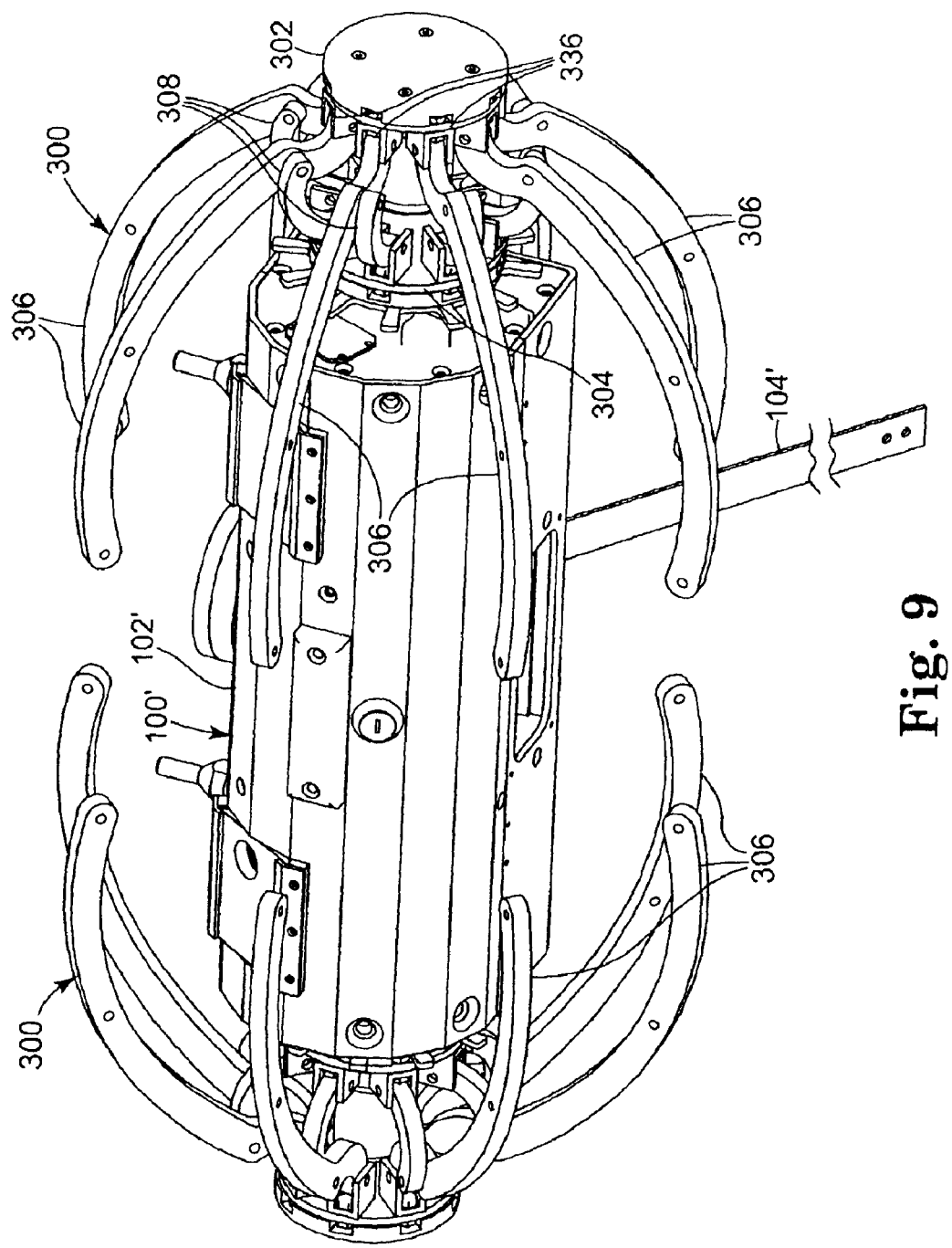
FIG. 9 is a diagrammatic perspective view of another exemplary robotic vehicle having an adjustable diameter wheel assembly in accordance with another embodiment of the present invention, the wheel assembly shown in a retracted configuration.

Like the embodiments already described herein, each wheel assembly 300 includes a first, e.g., powered, hub 302 and a second, e.g., driven, hub 304 as shown in FIG. 9. Unlike the wheel assembly 200, however, the first powered hub 302 is located at a distal end of the vehicle 300 and the second follower hub 304 is located between the first hub 302 and the body 102'.

The wheel assembly 300 also includes reconfigurable wheel members formed by a series of links. Two or more first links 306 are each pivotally connected to the first hub 302 and two or more second links 308 are each pivotally connected to the second hub 304 at a first end and to a corresponding first link 306 at a second end.

Figure 10:
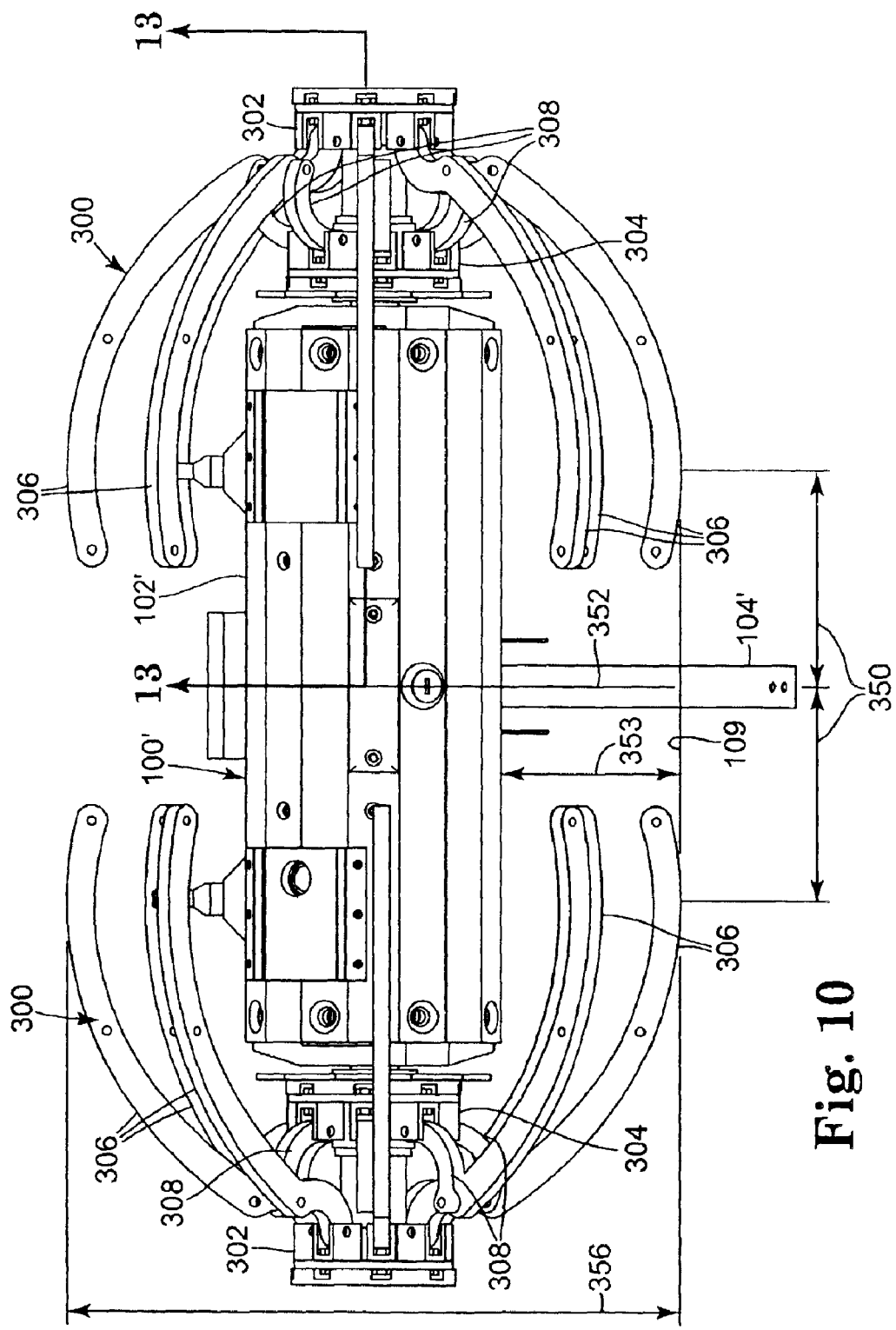
FIG. 10 is a front elevation view of the robotic vehicle of FIG. 9.

FIG. 10 is a front plan view of the of the vehicle 100' with the wheel assemblies 300 in a retracted, e.g., fully retracted, configuration. As clearly shown in this view, the first links 306 are preferably non-linear, e.g., curved, over at least a portion such that, when the wheel assembly is in the fully retracted configuration (as shown), the links 306 contact a ground surface 109 at a distance 350 from a generally vertical plane 352 bisecting the vehicle 100'. By using the curved links 306, the distance 350 is greater than if generally linear links were used. As a result, the vehicle 100' has a wider "wheelbase" that may improve its overall stability. In the retracted configuration illustrated in FIG. 10, the wheel assemblies 300 position the body 102' of the vehicle 100' at a distance 353 above the ground. The first hubs 302, second hubs 304, and second links 308 are also illustrated in this view.

Figure 11:
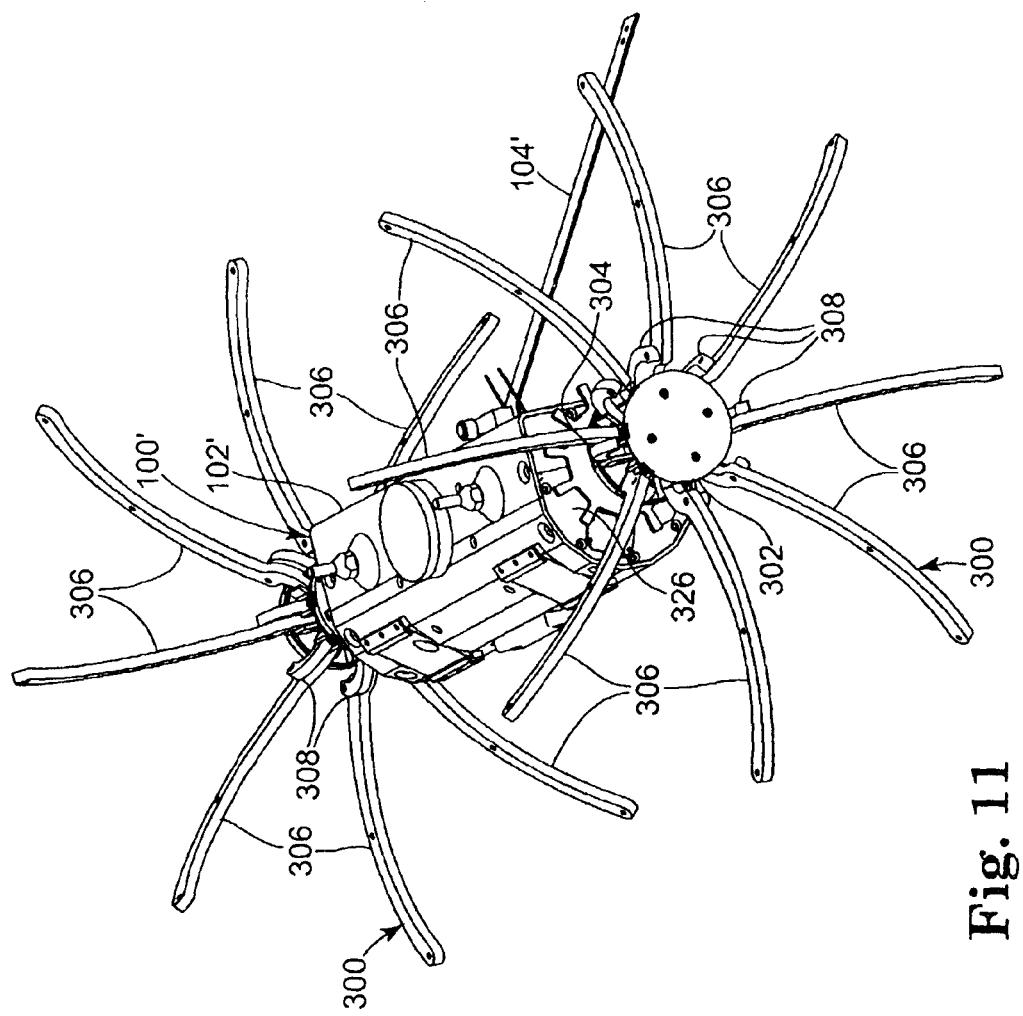
FIG. 11 is a perspective view of the robotic vehicle of FIG. 9 with the wheel assembly shown in an expanded configuration.

FIG. 11 illustrates the vehicle 100' with the wheel assemblies 300 each in an expanded, e.g., fully expanded, configuration. In this expanded configuration, the wheel assemblies are reconfigured to provide a larger rolling diameter than when in the retracted configuration of FIGS. 9–10. To achieve the larger rolling diameter, the first hub 302 and second hub 304 are axially repositioned, causing the first links 306 and the second links 308 to move to the positions illustrated in FIG. 11.

Figure 12:
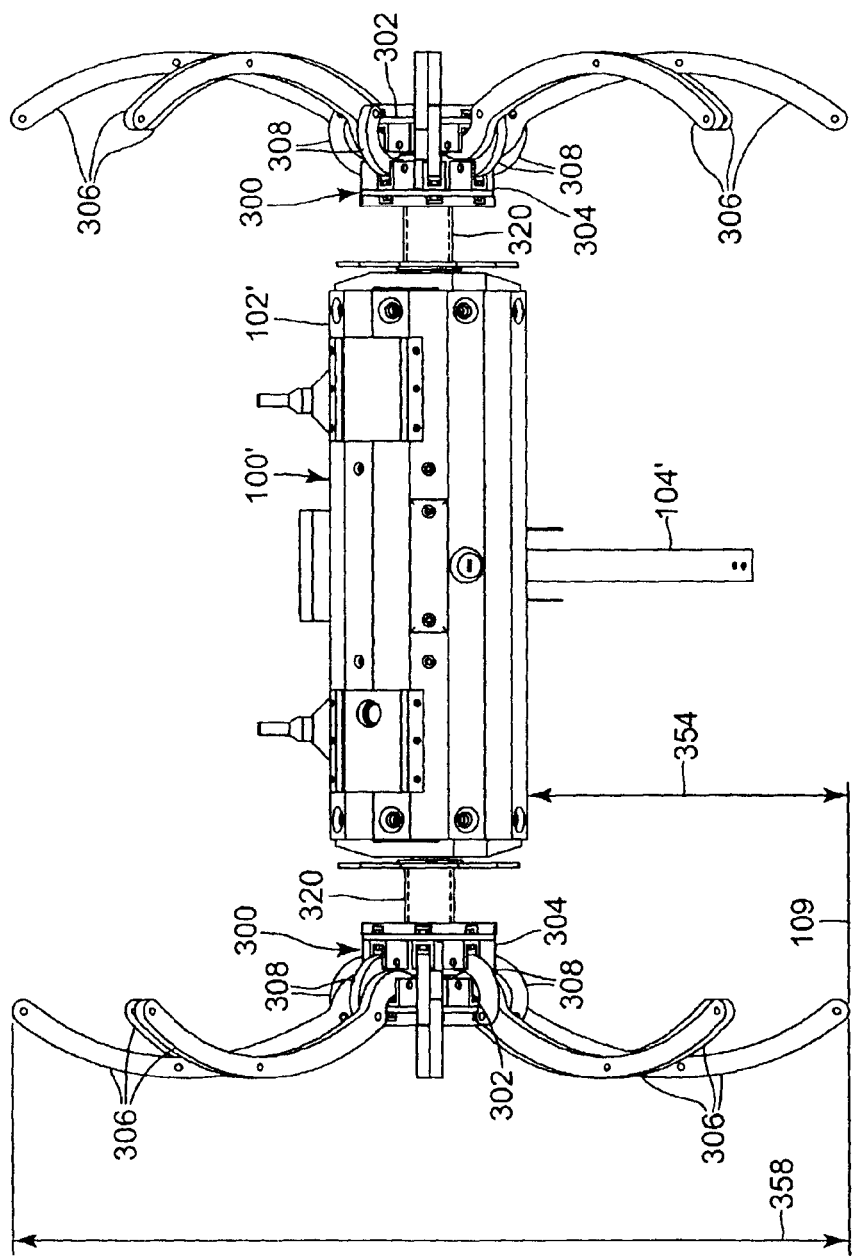
FIG. 12 is a front elevation view of the robotic vehicle of FIG. 11.

FIG. 12 is a front elevation view of the vehicle 100' with the wheel assemblies 300 each shown in the expanded configuration of FIG. 11. In this view, the second hubs 304 are shown displaced outwardly toward the first hubs 302 along a hollow main shaft 320 coaxially positioned over a powered axle 316 (see FIG. 13). As clearly evident in this view, the increased diameter of the wheel assembly 300 results in the vehicle 100' being at a higher elevation relative to the ground surface 109 (e.g., at a distance 354) when compared to the wheel assemblies 300 in their retracted configurations (see e.g., distance 353 of FIG. 10). As with the embodiments previously described herein, the wheel assembly 300 can be commanded to provide a range of rolling diameters spanning between a rolling diameter 356 provided by the retracted configuration (see e.g., FIG. 10) and a rolling diameter 358 provided by the expanded configuration (see e.g., FIG. 12) such that the vehicle height, e.g., ground clearance, may be adjusted between the distance 353 of FIG. 10 and the distance 354 of FIG. 12.

Figure 13:
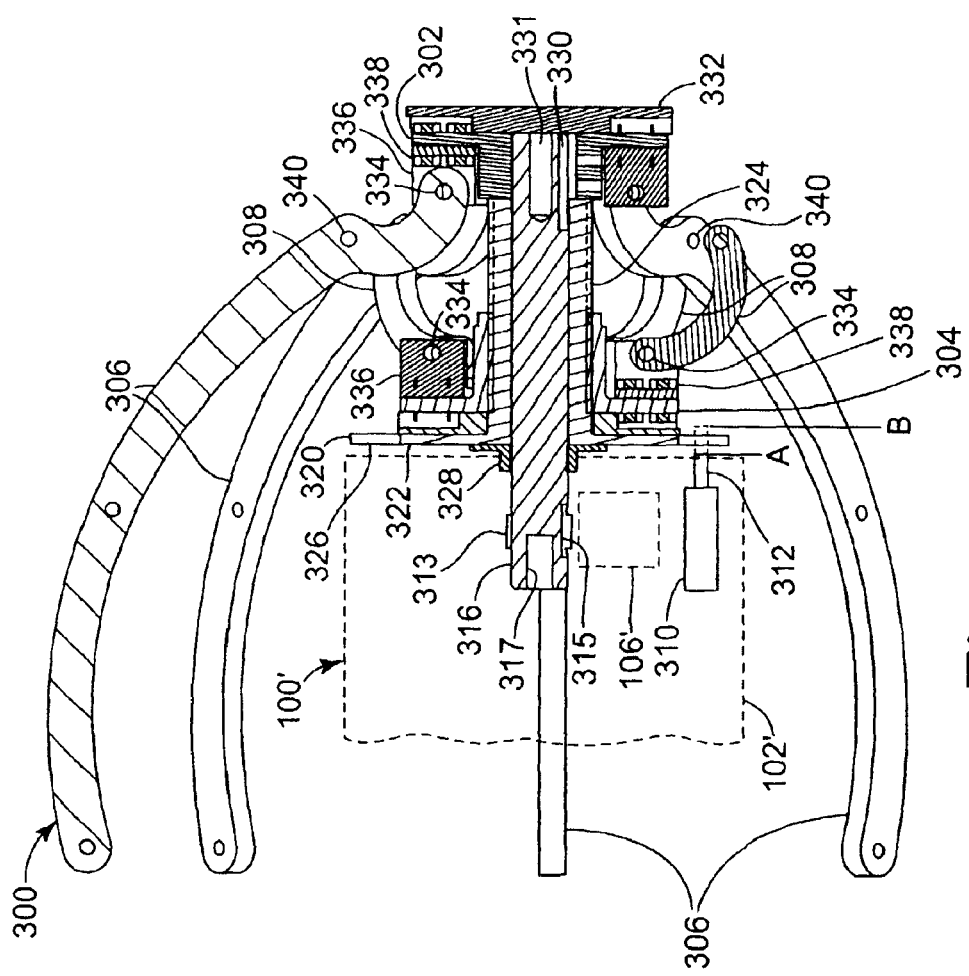
FIG. 13 is a partial section view of the robotic vehicle of FIG. 10 taken along line 13—13.

FIG. 13 is a cross sectional view of the wheel assembly 300 when the wheel assembly is in the retracted configuration. A threaded portion 317 of the axle 316 may be threadably engaged with the body 102' such that, when commanded, the axle 316 may be rotated to drive the wheel assembly 300 in a particular direction and at a particular speed. In one embodiment, the axle 316 may rotatably secure to the body 102' of the vehicle 100' with the threaded portion 317 and may be driven by a drive motor assembly 106' that meshes with a gear 313 to provide rotational power to the axle 316. The axle 316 may include a keyway 315 to receive the gear 313 and permit transmission of rotational power to the axle 316. The embodiment of FIG. 13 preferably secures the axle 316 to the body 102' such that relative axial movement is substantially limited between the two components. However, the axle 316 may rotate relative to the body 102' under the input power of the drive motor assembly 106' (or similar apparatus).

The main shaft 320 surrounds a portion of the axle 316 as shown in FIG. 13. The main shaft 320 may include a flanged portion 322 and a threaded portion 324. The flanged portion 322 may include cutouts 326 (see also FIG. 11) whose function is further described below. A thrust bushing 328 may also be included between the body 102' and the main shaft 320.

The first hub 302 may be coupled to a distal end of the axle 316 and secured thereto with a fastener (not shown) engaged with a threaded hole 331 in the axle. A key (not shown) may engage keyways 330 formed in both the axle 316 and the first hub 302 to generally prevent relative rotation between the two components. An endcap 332 may optionally cover the end of the first hub 302.

The first links 306 are coupled to the first hub 302 at pivot joints 334. The pivot joints 334 are generally identical to those already described above with respect to the links of FIGS. 1–8. While most any technique may be used to form the pivot joints 334, the illustrated embodiment utilizes a dual clevis 336 (best viewed in FIG. 9). Each link 306 may be positioned within a respective double clevis 336 and secured with any fastening element, e.g., bolt, rivet, bushing, etc., known in the art that will permit the desired pivoting motion. In the illustrated embodiment, the devises 336 are attached to the first hub 302 with fasteners 338.

An external surface of the main shaft 320 preferably includes the threaded portion 324 (shown diagrammatically in FIG. 13). The second hub 304 threadably engages the threaded portion 324 of the main shaft 320 such that relative rotation between the main shaft and the second hub causes axial movement of the second hub. The first hub 302, as described above, is coupled to the axle 316 such that relative rotation between the main shaft 320 and the first hub does not generally occur.

As with the first hub 302 and first links 306, the second links 308 may be coupled to the second hub 304 at pivot joints 334 formed by double devises 336 which are, in turn, secured to the second hub 304 by fasteners 338. The second links 308, e.g., a second end of each second link, may also pivotally couple to an intermediate portion of a respective first link 306 at a pivot joint 340.

For reasons that will become apparent below, the vehicle 100' may also include a locking apparatus 310 having a movable pin 312 operable to engage one of the openings 326 in the main shaft 320. While the locking apparatus may be a solenoid assembly as described above, other embodiments may include most any device that permits extension and retraction of a pin, e.g., the locking apparatus could be a rack-and-pinion type device that moves the pin by engaging a driving pinion with a linear rack gear coupled to the movable pin 312.

To propel the vehicle 100' across a surface, the movable pin 312 of the locking apparatus 310 may be retracted to position "A" as shown in FIG. 13. The wheel assembly 300 may then be rotated relative to the body 102' of the vehicle 100' by commanding the drive motor assembly 106' to rotate the gear 313 in a first direction at a first speed. The opposite drive wheel assembly 300 may be commanded to rotate at an identical speed and direction, resulting in straight, forward motion. To change direction, e.g., turn, the opposite drive wheel assembly 300 may be stopped or rotated at a different speed and/or direction.

When the drive motor assembly 106' is commanded to rotate the gear 313, the axle 316 rotates about its axis. As the axle 316 rotates, it imparts a rotational force to the first hub 302 (e.g., through the keyways 330), and thus to the first links 306, the second links 308, and the second hub 304. Due to the relatively high friction between the threads of the second hub 304 and those of the main shaft 320, the main shaft also rotates. That is, during rolling operation of the vehicle 100', the first hub 302, the second hub 304, the first links 306, the second links 308, and the main shaft 320 all rotate with the axle 316.

During operation over uneven terrain (e.g., discontinuous or undulating surfaces such as rocks, ground depressions, bumps, etc.) or when it is otherwise desirable to raise the body 102' of the vehicle 100', the wheel assembly 300 may be commanded to expand it rolling diameter. For example, the vehicle 100' may be commanded to change its configuration from that of the fully retracted wheel assembly having rolling diameter 356 (see FIGS. 9–10), to the fully expanded configuration having rolling diameter 358 (see FIGS. 11–12), or to any rolling diameter inbetween.

To adjust the rolling diameter, the vehicle 100'0 may be stopped and the locking apparatus 310 may be commanded to extend the locking pin 312 to the "B" position. The locking pin 312 may then engage one of the cutouts 326 in the main shaft 320.

Once the locking pin 312 is engaged with the main shaft 320, the main shaft becomes generally rotationally fixed relative to the vehicle body 102'. Subsequent rotation of the axle 316 causes rotation of the first hub 302 and thus the first links 306, the second links 308, and the second hub 304. However, with the main shaft 320 now generally rotationally fixed relative to the body 102', rotation of the first and second hubs 302, 304 causes the second hub 304 to move axially along the threaded portion 324 of the main shaft 220 relative to, e.g., toward, the first hub 302. That is, the second hub 304 moves along the generally fixed main shaft 320 due to the mating engagement of the threaded portion 324 with the thread of the second hub 304.

As the second hub 304 approaches the first hub 302, the geometric relationship between the first and second links 306, 308 and the first and second hubs results in contact portions, e.g., distal ends, of the first links 306 moving radially away from the body 102', thus raising the elevation of the body in the process.

While the wheel assembly 300 is shown in the figures in either a fully expanded or fully retracted configuration, the axle rotation may be stopped at any time. Accordingly, the wheel assembly 300 can be moved from its fully retracted configuration to its fully expanded configuration, or to any location inbetween, i.e., the wheel assembly has an infinitely adjustable rolling diameter. Due to the rotational motion of the wheel assemblies 300 during expansion and contraction, the vehicle 100' may experience some forward (or rearward) motion during adjustment of the rolling diameter of the wheel assembly 300.

When the wheel assembly 300 has reached the desired configuration (rolling diameter), the drive motor assembly 106' may be commanded to stop. The locking assembly 310 may then be commanded to retract the locking pin 312 from the opening 326 in the main shaft 320. Subsequent activation of the drive motor assembly 106' results in rotation of not only the hubs 302, 304; links 306, 308; and axle 316, but also the main shaft 320. That is, the wheel assembly 300 propels the vehicle across the ground surface while maintaining its newly selected rolling diameter.

The vehicle 100' may operate with the expanded wheel diameter for as long as necessary. When desirable or prudent, e.g., when the vehicle 100' approaches a small entrance or is otherwise better suited to lower elevation, the procedure described above may be re-executed and the wheel assembly 300 returned to a configuration having a smaller rolling diameter. The wheel assembly 300 may be reconfigured to a smaller rolling diameter by engaging the locking apparatus 310 and driving the drive motor assembly 106' in a direction opposite that used to expand the wheel assembly 300.

In an exemplary embodiment, the vehicle 100' has a body 102' that is about 12.5 cm in diameter, about 40 cm long, and, with two wheel assemblies 300 attached, weighs about 13600 grams. The wheel assemblies 300 extend outwardly about 11.5 cm from the edge of the body 102 in the fully retracted configuration, and are actuatable over a range of rolling diameters varying from about 27 cm to about 50 cm. The threaded portion 230 of the main shaft has a 1.25–7 UNC thread formed thereon. The drive motor assembly 106 is rated for about 2050 g-cm of torque on a continuous basis, and produces about 25,500 g-cm of torque at stall. A planetary gearbox (not shown) reduces the speed by a factor of 3.5, and a spur gear reduction of about 4 brings the total reduction to about 14:1. The continuous duty torque available to the wheel assembly 300 is about 28,700 g-cm, although actual stall torque may be much, e.g., 2–3 times, higher.

Figure 14:
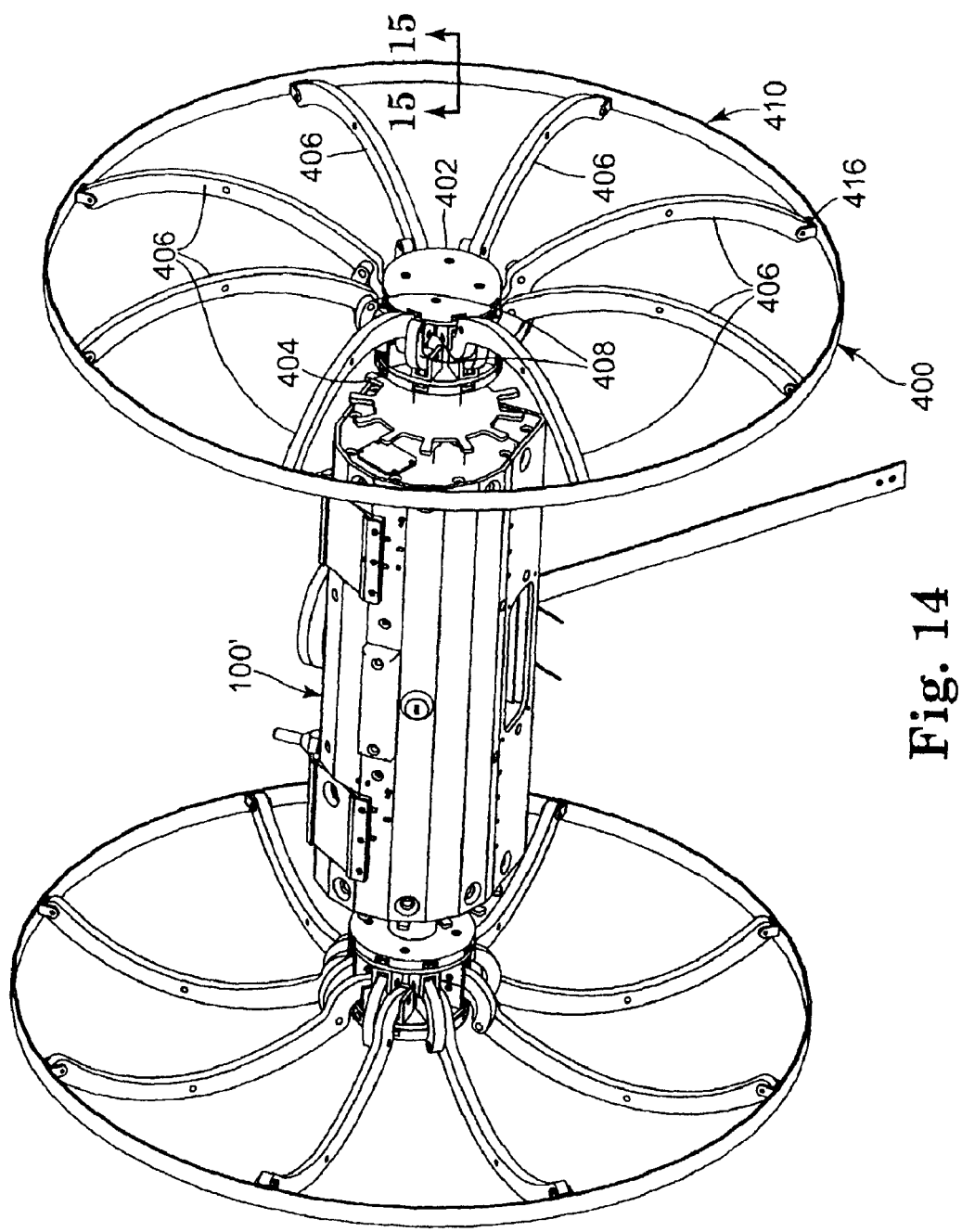
FIG. 14 is a diagrammatic perspective view of another robotic vehicle having an adjustable diameter wheel assembly in accordance with yet another embodiment of the present invention, the wheel assembly shown in an expanded configuration.

While shown herein above with reference to specific embodiments, other wheel assembly configurations are certainly possible without departing from the scope of the invention. For example, FIG. 14 illustrates the robotic vehicle 100' having a wheel assembly 400 in accordance with yet another embodiment of the invention. The wheel assembly 400 is similar to the wheel assembly 300 described herein. For example, the wheel assembly 400 includes a first hub 402, a second hub 404, first links 406, and second links 408 that are generally identical to the related components of the wheel assembly 300. However, the wheel assembly 400 may further include a support member, e.g., circumferential ring 410, attached to distal ends (or other ground contact portions) of at least two of the first links 406.

Figure 15:
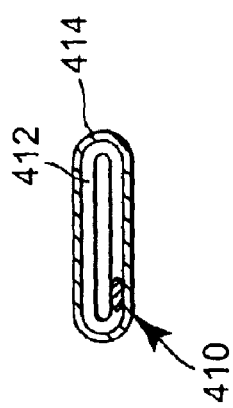
FIG. 15 is a section view taken along line 15—15 of FIG. 14.

The ring 410 may be made of most any resilient material that can maintain its shape over a broad range of rolling diameters. For example, the ring 410 may be formed of a coiled spring 412 , e.g., a metallic constant force spring as shown in FIG. 15. In the illustrated embodiment, the spring 412 is configured as a generally flattened ribbon of material coiled to form a ring-like structure. In its relaxed state, the spring 412 may includes numerous overlapping coils. During expansion of the spring 412, the coils separate such that fewer and fewer coils overlap.

Each link 406 may attach to the ring 410 with a bracket 416. Preferably, each bracket 416 provides a pivotal connection between the respective link 406 and the ring 410. The brackets 416 allow the ring 410 to expand and retract while maintaining a circular profile. They may also permit the ring 410 to maintain the desired orientation regardless of the wheel assembly's rolling diameter.

The brackets 416 may optionally include some shock absorption component, e.g., a resilient washer, to reduce shock loading on the robotic vehicle 100'. The ring 410 may also optionally include a flexible outer membrane 414 (see FIG. 15) that allows better traction and protects the spring 412 from contaminants, e.g., dirt and dust.

Figure 16:
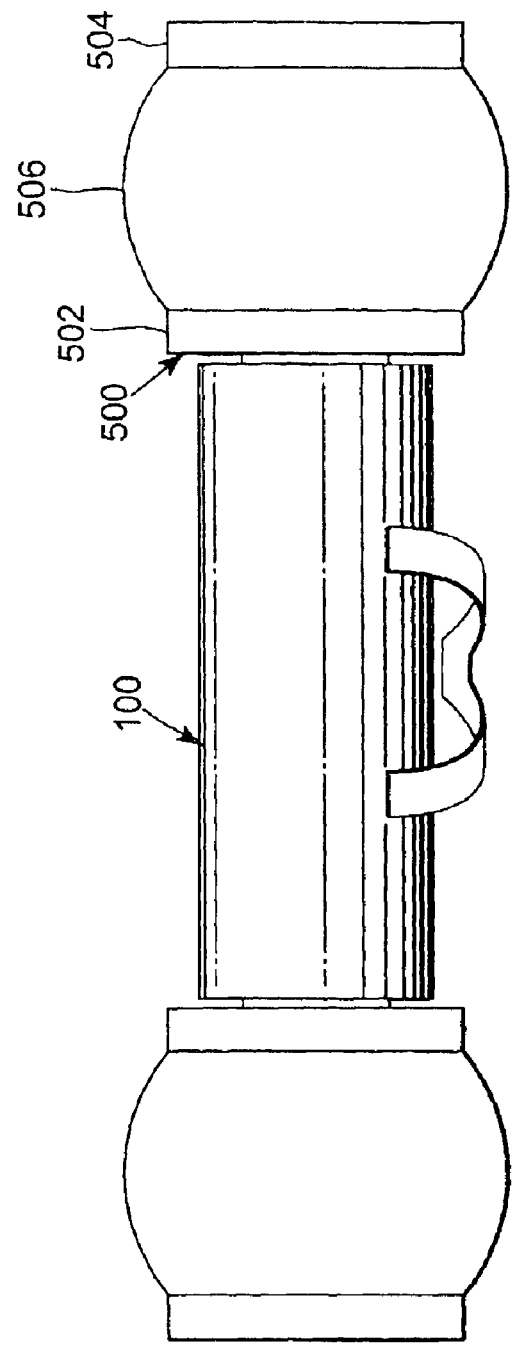
FIG. 16 is a diagrammatic perspective view of another robotic vehicle having an adjustable diameter wheel assembly in accordance with still yet another embodiment of the present invention, the wheel assembly shown in a partially expanded configuration.

FIG. 16 illustrates another embodiment of the present invention. Here the vehicle 100 (described above with respect to FIGS. 1–8) is shown incorporating a wheel assembly 500. The wheel assembly 500 may be similar in construction to wheel assemblies 200 and 300 described above except that the wheel member in this embodiment is a hollow, elastic membrane 506 extending between and coupled to a first hub 502 and a second hub 504. Alternatively, links (e.g., similar to links 206, 208 or 306, 308 in FIGS. 1–13) could be included underneath the membrane 506 to assist in maintaining the membrane shape. In other embodiments, a compressible member, e.g., a foam cylinder, could be included within the membrane 506 and between the hubs to help shape the membrane. The incorporation of the membrane 506 creates the desired cylindrical wheel profile and further may provide a degree of damping or shock absorption to the vehicle 100.

Other embodiments are also possible based on combinations of the elements already described herein alone or in combination with still other features. For example, while the links that form the wheel assemblies are illustrated and described herein as generally rigid, one or more links may include spring elements to allow some degree of damping. Alternatively, the links could bend similar to a human knee. To obtain this structure, a rigid link may include a secondary element pivotally connected and biased in a particular direction. Alternatively, the entire link may be made of a flexible material. Providing some level of shock absorption may allow the wheel assembly to run more smoothly, run at higher speeds, and reduce the shock and stress transmitted to the robotic vehicle.

In addition to the bending or flexible links, the links could incorporate relative soft structures, e.g., at the tips or other ground contact locations to produce a similar shock absorption effect. Moreover, while shown herein as utilizing bent or curved first links, the links may be of most any shape, e.g., straight.

Robotic vehicles having wheel assemblies in accordance with the embodiments described above are thus able to provide an infinitely adjustable range of rolling diameters to assist with vehicle elevation control. Moreover, the wheel assemblies described herein achieve this adjustability using the same driving apparatus used to rotate the wheel during rotation, i.e., no separate drive actuation apparatus is necessary.

The complete disclosure of the patents, patent documents, and publications cited in the Background, the Detailed Description of Exemplary Embodiments, and elsewhere herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention.

What is claimed is:

1. A wheel assembly for use with a vehicle, the wheel assembly adjustable to provide a range of rolling diameters, wherein the wheel assembly comprises:
   a main shaft comprising an externally threaded portion;
   a first hub and a second hub located on or adjacent the main shaft, wherein either the first hub or the second hub is threadably coupled to the threaded portion of the main shaft;
   at least one reconfigurable wheel member coupled to both the first hub and the second hub, the wheel member having ground contact portions that define a rolling diameter of the wheel assembly;
   a selectively engageable locking apparatus operable to restrict rotation of the main shaft relative to the vehicle.

2. The wheel assembly of claim 1, wherein the at least one reconfigurable wheel member comprises a plurality of links pivotally connected to the first hub and the second hub.

3. The wheel assembly of claim 2, wherein the ground contact portions comprise a portion of one or more of the plurality of links.

4. The wheel assembly of claim 1, wherein the at least one reconfigurable wheel member comprises an elastic membrane.

5. A method of varying a rolling diameter of a powered wheel assembly for use with a ground-engaging vehicle, the method comprising:
   providing a wheel assembly attached to the vehicle, the wheel assembly comprising:
     a main shaft comprising an externally threaded portion;
     a first hub positioned for rotation about an axis of the main shaft;
     a second hub threadably engaged with the externally threaded portion of the main shaft;
     a plurality of first links each pivotally coupled to the first hub; and
     a plurality of second links each pivotally coupled to both the second hub and to one of the plurality of first links, wherein ground contact portions of either the plurality of first links or the plurality of second links define a rolling diameter of the wheel assembly;
   selectively preventing relative rotation between the main shaft and the vehicle; and
   rotating the first hub in a first direction, thereby causing the second hub to move along the threaded portion of the main shaft toward the first hub, thus repositioning the plurality of first links and the plurality of second links such that the ground contact portions move radially outward from the axis of the main shaft.

6. The method of claim 5, further comprising rotating the first hub in a second direction, thereby causing the second hub to move along the threaded portion of the main shaft away from the first hub, thus repositioning the plurality of first links and the plurality of second links such that the ground contact portions move radially inward toward the axis of the main shaft.

7. The method of claim 5, further comprising selectively allowing relative rotation between the main shaft and the vehicle, whereby subsequent rotation of the first hub in the first direction results in corresponding rotation of the second hub, the main shaft, the plurality of first link members, and the plurality of second link members.

8. A powered wheel assembly operable to provide a selectable range of rolling diameters to a vehicle, the wheel assembly comprising:
   a main shaft comprising an externally threaded portion, wherein the main shaft is rotatable about an axle;
   a first hub positioned for rotation about an axis of the main shaft;
   a second hub threadably engaged with the externally threaded portion of the main shaft;
   a plurality of first links each pivotally coupled to the first hub; and
   a plurality of second links each pivotally coupled to both the second hub and to one of the plurality of first, wherein ground contact portions of either the plurality of first links or the plurality of second links define a rolling diameter of the wheel assembly.

9. The wheel assembly of claim 8, wherein the axle is fixed.

10. The wheel assembly of claim 8, wherein the axle is powered.

11. The wheel assembly of claim 8, wherein the first hub is secured to the axle to prevent relative rotation therebetween.

12. The wheel assembly of claim 8, wherein the plurality of first links comprises eight first links and the plurality of second links comprises eight second links.

13. The wheel assembly of claim 8, wherein portions of the plurality of first links comprise the ground contact portions.

14. The wheel assembly of claim 8, wherein relative movement of the second hub, along the axis of the main shaft, toward the first hub results in movement of the ground contact portions radially away from the main shaft.

15. The wheel assembly of claim 8, wherein relative movement of the second hub, along the axis of the main shaft, away from the first hub results in movement of the ground contact portions radially toward the main shaft.

16. The wheel assembly of claim 8, wherein one or both of the plurality of first links and the plurality of second links are substantially rigid.

17. The wheel assembly of claim 8, further comprising a locking apparatus operable to selectively stop or limit rotation of the main shaft relative to the vehicle.

18. The wheel assembly of claim 8, further comprising a driving apparatus coupled to the vehicle and operable to both rotate the wheel assembly and change the rolling diameter of the wheel assembly.

19. The wheel assembly of claim 18, wherein the driving apparatus, when the vehicle is in a first configuration, selectively rotates the first hub, and the main shaft simultaneously about the axis of the main shaft to propel the vehicle, and, when the vehicle is in a second configuration, selectively rotates the first hub and the second hub relative to the main shaft to adjust the rolling diameter of the wheel assembly.

20. A powered wheel assembly operable to provide a selectable range of rolling diameters to a vehicle, the wheel assembly comprising:
- a main shaft comprising an externally threaded portion;
- a first hub positioned for rotation about an axis of the main shaft;
- a sprocket coupled to the first hub;
- a second hub threadably engaged with the externally threaded portion of the main shaft;
- a plurality of first links each pivotally coupled to the first hub; and
- a plurality of second links each pivotally coupled to both the second hub and to one of the plurality of links, wherein ground contact portions of either the plurality of either the plurality of first links or the plurality of second links define a rolling diameter of the wheel assembly.

21. A powered wheel assembly operable to provide a selectable range of rolling diameters to a vehicle, the wheel assembly comprising:
- a main shaft comprising an externally threaded portion;
- a first hub positioned for rotation about an axis of the main shaft;
- a second hub threadably engaged with the externally threaded portion of the main shaft;
- a plurality of first links each pivotally coupled to the first hub;
- a plurality of second links each pivotally coupled to both the second hub and to one of the plurality of links, wherein ground contact portions of either the plurality of either the plurality of first links or the plurality of second links define a rolling diameter of the wheel assembly; and
- a support member spanning between at least two ground contact portions.

22. A robotic vehicle having an adjustable ground clearance, the vehicle comprising:
- a driving apparatus coupled to a body of the vehicle and operable to provide driving power to the vehicle;
- at least one wheel assembly coupled to the body of the vehicle, at least one wheel assembly comprising:
  - a main shaft comprising an externally threaded portion;
  - a first hub positioned for rotation about an axis of the main shaft;
  - a second hub threadably engaged with the externally threaded portion of the main shaft; and
  - at least one configurable wheel member coupled to both the first hub the second hub, the wheel member comprising an elastic membrane having ground contact portions that define a rolling diameter of at least one wheel assembly; and
- a locking apparatus coupled to the body of the vehicle and operable to lock the main shaft relative to the body of the vehicle.

* * * * *

UNITED STATES PATENT AND TRADEMARK OFFICE
CERTIFICATE OF CORRECTION

PATENT NO. : 6,860,346 B2  
DATED : March 1, 2005  
INVENTOR(S) : Burt et al.

It is certified that error appears in the above-identified patent and that said Letters Patent is hereby corrected as shown below:

<u>Column 16,</u>
Line 24, after "of first" insert -- links -- therefor.

<u>Column 17,</u>
Line 13, after "plurality of" insert -- first -- therefor.
Line 15, after "of" delete "either the plurality of".

<u>Column 18,</u>
Line 2, after "plurality of" insert -- first -- therefor.
Line 4, after the first occurrence of the word "of", delete "either the plurality of".
Line 14, after "vehicle," insert -- the -- therefor.
Line 21, after "first hub" insert -- and -- therefor.
Line 23, after "diameter of" insert -- the -- therefor.

Signed and Sealed this

Eighth Day of November, 2005

JON W. DUDAS
*Director of the United States Patent and Trademark Office*